(12) United States Patent
Kawamura

(10) Patent No.: US 8,964,312 B2
(45) Date of Patent: Feb. 24, 2015

(54) IMAGING LENS AND IMAGING APPARATUS

(71) Applicant: FUJIFILM Corporation, Tokyo (JP)

(72) Inventor: Daiki Kawamura, Saitama-ken (JP)

(73) Assignee: Fujifilm Corporation, Tokyo (JP)

(\*) Notice: Subject to any disclaimer, the term of this patent is extended or adjusted under 35 U.S.C. 154(b) by 0 days.

(21) Appl. No.: 14/273,898

(22) Filed: May 9, 2014

(65) Prior Publication Data

US 2014/0268367 A1    Sep. 18, 2014

Related U.S. Application Data

(63) Continuation of application No. PCT/JP2012/007120, filed on Nov. 7, 2012.

(30) Foreign Application Priority Data

Nov. 9, 2011  (JP) ................................ 2011-245309

(51) Int. Cl.
*G02B 9/04*    (2006.01)
*G02B 9/58*    (2006.01)
(Continued)

(52) U.S. Cl.
CPC .............. *G02B 13/0045* (2013.01); *G02B 9/04* (2013.01); *G02B 9/58* (2013.01); *G02B 13/04* (2013.01); *G02B 13/18* (2013.01)
USPC .......................................... 359/793; 359/782

(58) Field of Classification Search
CPC .. G02B 13/001; G02B 13/0045; G02B 13/04; G02B 13/18; G02B 9/04–9/10; G02B 9/34; G02B 9/58; G02B 9/60; G02B 9/62; G02B 9/64; G02B 15/22; G02B 15/24
USPC ......... 359/781, 782, 691, 686, 793, 794, 771, 359/680–682, 708, 713–717, 749–753, 359/754–756, 761, 763–770, 791, 796

See application file for complete search history.

(56) References Cited

U.S. PATENT DOCUMENTS 5,528,428 A    6/1996    Ohtake et al.
(Continued)

FOREIGN PATENT DOCUMENTS

JP    05-134175    5/1993
(Continued)

OTHER PUBLICATIONS

International Search Report, PCT/JP2012/007120, Mar. 5, 2013.

*Primary Examiner* — William Choi
*Assistant Examiner* — Cara Rakowski
(74) *Attorney, Agent, or Firm* — Young & Thompson

(57) ABSTRACT

An imaging lens includes: a first lens group; an aperture stop; and a second lens group having a positive power, in this order from an object side. The first lens group includes a first lens having a negative power and a second lens having a positive power. The imaging lens satisfies Conditional Formulae (1), (2), and (3):

$-0.50 < f/f1 < 0.20$ (1)

$0.08 < d12/f < 0.35$ (2)

$2.5 < TL/Y < 4.0$ (3)

wherein f is the focal length of the entire system, f1 is the focal length of the first lens group, d12 is a distance along an optical axis from the image side lens surface of the first lens to the object side lens surface of the second lens, TL is the distance along the optical axis from the most object side lens surface within the first lens group to an imaging surface Sim, and Y is a maximum image height, when focused on an object at infinity.

19 Claims, 11 Drawing Sheets

EXAMPLE 1

(51) Int. Cl.
*G02B 13/00* (2006.01)
*G02B 13/04* (2006.01)
*G02B 13/18* (2006.01)

(56) References Cited

U.S. PATENT DOCUMENTS

| | | | |
|---|---|---|---|
| 5,621,575 A | 4/1997 | Toyama | |
| 5,668,669 A | 9/1997 | Ohtake et al. | |
| 7,466,490 B2 | 12/2008 | Igarashi | |
| 7,940,478 B2 * | 5/2011 | Take | 359/794 |
| 8,503,110 B2 | 8/2013 | Oshita | |

FOREIGN PATENT DOCUMENTS

| | | |
|---|---|---|
| JP | 06-160706 | 6/1994 |
| JP | 06-324264 | 11/1994 |
| JP | 08-286105 | 11/1996 |
| JP | 09-043512 | 2/1997 |
| JP | 10-020188 | 1/1998 |
| JP | 11-142730 | 5/1999 |
| JP | 2003-098430 | 4/2003 |
| JP | 2008-040033 | 2/2008 |
| JP | 2008-107391 | 5/2008 |
| JP | 2009-258157 | 11/2009 |
| JP | 2011-059288 | 3/2011 |
| JP | 2012-181508 | 9/2012 |
| JP | 2012-234169 | 11/2012 |

* cited by examiner

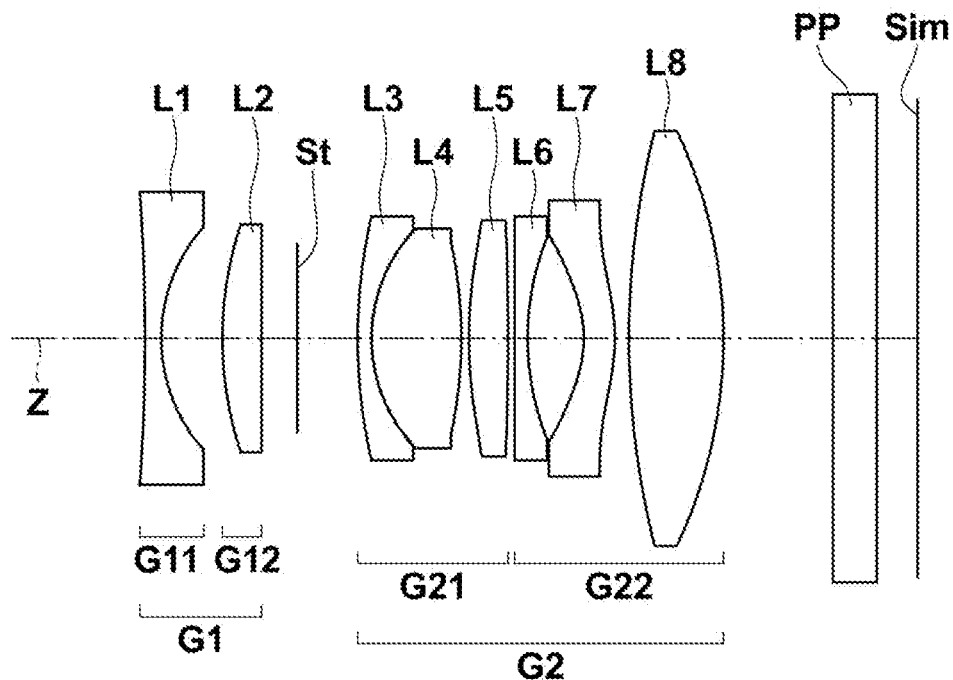
FIG.1  EXAMPLE 1
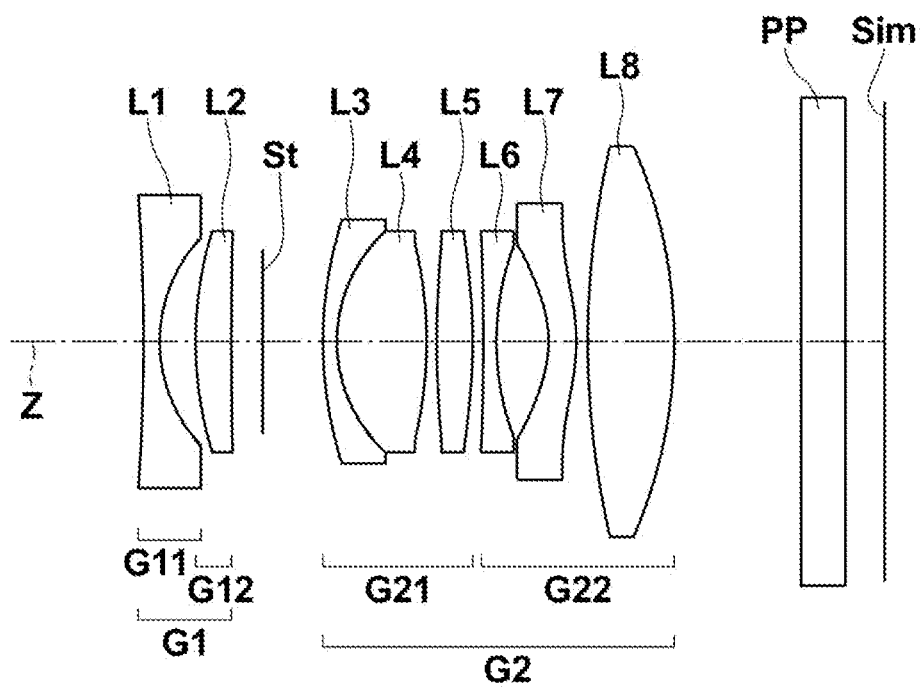
FIG.2  EXAMPLE 2

EXAMPLE 3

EXAMPLE 4

EXAMPLE 5

EXAMPLE 6

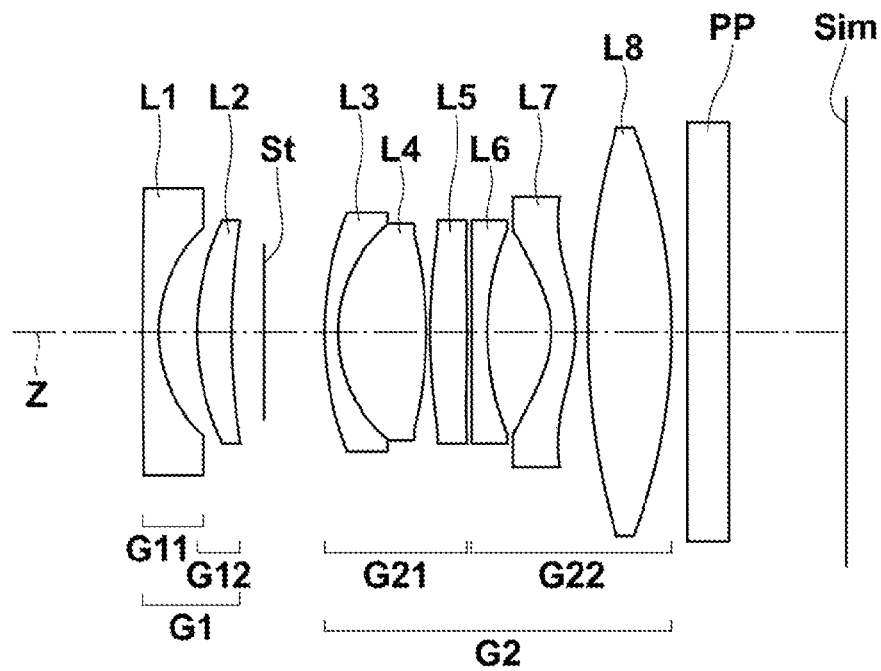
FIG.7  EXAMPLE 7
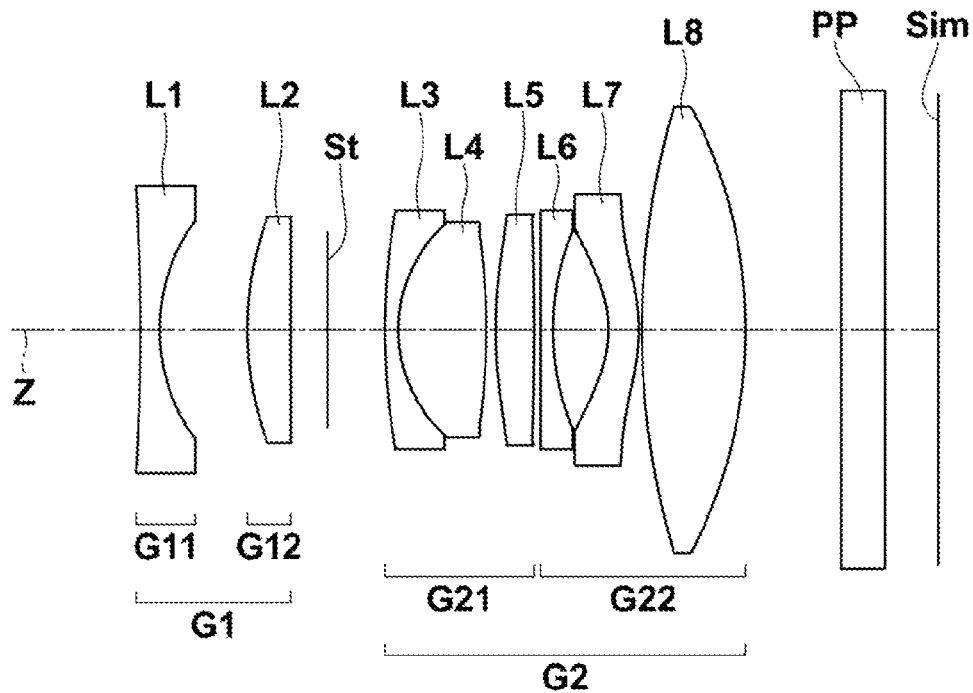
FIG.8  EXAMPLE 8

EXAMPLE 9

EXAMPLE 1

EXAMPLE 6

EXAMPLE 7

IMAGING LENS AND IMAGING APPARATUS

TECHNICAL FIELD

The present invention is related to an imaging lens, and particularly to a compact, wide angle lens suitable for imaging apparatuses such as electronic cameras.

The present invention is also related to an imaging apparatus equipped with such an imaging lens.

DESCRIPTION OF THE RELATED ART

In recent years, there are many digital cameras equipped with large imaging devices that comply with the APS format or the four thirds format, for example, are commercially available. Recently, such cameras are not limited to digital single lens reflex cameras, and exchangeable lens digital cameras without reflex finders and compact cameras also employ the aforementioned large imaging devices. The advantages of these cameras are that they are compact as a whole and are highly portable, while enabling imaging at high quality. Accompanying the development of such cameras, there is demand for compact lens systems. Examples of wide angle lenses which are compatible with these large imaging devices include those disclosed in Japanese Unexamined Patent Publication Nos. 6 (1994)-160706, 2008-040033, 2011-059288, and 2009-258157.

Conventionally, retro focus type lenses constituted by a front group having a negative refractive power and a rear group having a positive refractive power are known as wide angle lenses to be mounted on digital cameras and video cameras. In wide angle lenses which are mounted on digital cameras, it is necessary to secure a wide angle of view, while an amount of back focus sufficient to insert various filters and optical members is also required. Therefore, the aforementioned retro focus type of lens, which is capable of obtaining a long back focus with respect to focal length, had been widely employed. Japanese Unexamined Patent Publication Nos. 6(1994)-160706 and 2008-040033 disclose typical examples of retro focus type lenses. In addition, Japanese Unexamined Patent Publication No. 2011-059288 discloses an example of an imaging lens having a small number of lenses, which is configured to be compact.

In exchangeable lenses of single lens reflex cameras and the like, it is necessary to adopt the retro focus type configuration, in order to secure a wide angle of view and to obtain a long back focus. However, in cases that a large amount of back focus is not necessary, or in cases that miniaturization or achieving a thin configuration is prioritized, a wide angle lens may adopt a configuration in which the negative power thereof is weak, as appropriate. Further, in such a case, a telephoto type configuration, in which a front group has a positive refractive power and a rear group has a negative refractive, that is, having a reverse arrangement of power from that of the retro focus type, or another type of configuration, may be adopted.

It is easy to shorten the entire length of the lens system in the telephoto type configuration. However, in the case that the leading lens group has a positive refractive power, the incident angle (an angle with respect to the optical axis) of principal off axis light rays that enter a subsequent lens group will become great, and therefore a problem arises that correction of aberrations becomes difficult when attempting to widen the angle of view. Therefore, adopting a cross of these two types of configurations is also being considered. Specifically, a configuration, in which a negative lens is employed as the lens most toward the object side while a front group has a positive power as a whole, is being considered. For example, Japanese Unexamined Patent Publication No. 2009-258157 discloses an example of an imaging lens having a leading negative lens, but in which a front group has a positive refractive power as a whole. In addition, a configuration in which a simplified wide conversion lens section is provided toward the object side of a telephoto type lens is also being considered as another cross of the two types of configurations.

DISCLOSURE OF THE INVENTION

It is recognized that imaging lenses of the retro focus type such as those disclosed in Japanese Unexamined Patent Publication Nos. 6 (1994)-160706 and 2008-040033 have a problem that the total lengths thereof tend to become long. In addition, another characteristic feature of this type of imaging lens is that a front group has a comparatively large spatial distance, and the diameter of a first lens also tends to be large. Further, the lens groups in front of and behind an aperture stop are not symmetrical in this type of imaging lens, which results in correction of aberrations becoming difficult. In addition, if a sufficient widening of the imaging angle or an increase in the diameter is attempted, an increase in the number of lenses and the lens system becoming large is unavoidable. An example of an imaging lens which is configured to be compact is that which is disclosed in Japanese Unexamined Patent Publication No. 2011-059288. However, this imaging lens has an angle of view of 61°, which is not a sufficiently wide angle of view.

Meanwhile, the imaging lens of the aforementioned cross type disclosed in Japanese Unexamined Patent Publication No. 2009-258157 has a small number of lenses and is capable of being configured to be compact. However, this imaging lens has an angle of view of 62°, which is also not a sufficiently wide angle of view.

The present invention has been developed in view of the foregoing circumstances. It is an object of the present invention to provide an imaging lens capable of being configured to be compact and capable of securing a wide angle of view. It is another object of the present invention to provide an imaging apparatus equipped with such an imaging lens, which is capable of being configured to be compact and capable of imaging with a wide angle of view.

An imaging lens of the present invention substantially consists of:

a first lens group having a negative or a positive refractive power;

an aperture stop; and a second lens group having a positive refractive power, provided in this order from an object side;

the first lens group being constituted by an 11 lens group having a negative refractive power and a 12 lens group having a positive refractive power, which are constituted by 3 or fewer lenses as a whole, provided in this order from the object side;

the 11 lens group being constituted by a single first lens, and the 12 lens group being constituted by a single lens, which is a positive lens component, provided at a spatial interval from the first lens or by a cemented lens, which is a positive lens component, provided at a spatial interval from the first lens;

the second lens group substantially consisting of a 21 lens group having a positive refractive power and a 22 lens group having a negative refractive power, provided in which order from the object side;

the 21 lens group having at least one positive lens and at least one negative lens;

the 22 lens group substantially consisting of a total of three lenses that include at least one positive lens and at least one negative lens; and the imaging lens satisfying the following conditional formulae:

$$-0.50 < f/f1 < 0.20 \quad (1)$$

$$0.08 < d12/f < 0.35 \quad (2)$$

$$2.5 < TL/Y < 4.0 \quad (3)$$

wherein f is the focal length of the entire lens system, f1 is the focal length of the first lens group, d12 is a distance along an optical axis from the lens surface toward an image side of the first lens within the first lens group to the lens surface most toward the object side of the positive lens component, TL is the distance along the optical axis from the lens surface most toward the object side within the first lens group to the imaging surface (back focus is an air converted length), and Y is a maximum image height, when focused on an object at infinity.

Note that the expression "substantially consists of . . . " which appears at three locations above includes cases in which the imaging lens includes lenses that practically have not power, optical elements other than lenses such as an aperture stop and a cover glass, and mechanical portions such as lens flanges, a lens barrel, an imaging device, and a blur correcting mechanism, in addition to the lens groups listed above as constituent elements.

In addition, the shapes of the surfaces of the lenses and the signs of the refractive powers thereof are considered in the paraxial regions for aspherical surfaces, if lenses having aspherical surfaces are included.

Note that it is particularly desirable for the imaging lens of the present invention to satisfy at least one of the conditional formulae below, within the ranges defined in Conditional Formulae (1), (2), and (3):

$$-0.45 < f/f1 < 0.15 \quad (1')$$

$$0.10 < d12/f < 0.32 \quad (2')$$

$$1.7 < TL/Y < 3.8 \quad (3').$$

Further, it is particularly desirable for the following conditional formula to be satisfied within the range defined in Conditional Formula (1) or Conditional Formula (1'):

$$-0.42 < f/f1 < 0.10 \quad (1'').$$

It is desirable for the 22 lens group to be constituted only by a sub lens group having a negative refractive power and a single positive lens, provided in this order from the object side.

In addition, it is desirable for the imaging lens of the present invention to satisfy the following conditional formula:

$$1.75 < Nd22 \quad (4)$$

wherein Nd22 is the average value of the refractive indices of all of the lenses within the 22 lens group with respect to the d line.

Further, it is more desirable for the imaging lens of the present invention to satisfy the following conditional formula, within the range defined in Conditional Formula (4):

$$1.78 < Nd22 \quad (4').$$

It is desirable for a lens having at least one surface which is aspherical surface to be provided within the 22 lens group.

In addition, it is desirable for a negative lens having a surface toward the object side which is concave toward the object side in a paraxial region, and of which at least one surface is an aspherical surface, to be provided within the 22 lens group.

Meanwhile, it is desirable for the 21 lens group to be constituted by a total of three lenses, which are a positive lens and a negative lens cemented together, and a single positive lens.

Further, it is desirable for a positive lens having at least one aspherical surface to be provided within the 21 lens group.

In addition, it is desirable for the imaging lens of the present invention to satisfy the following conditional formula:

$$1.1 < TL/\Sigma d < 1.5 \quad (5)$$

wherein $\Sigma d$ is the distance along the optical axis from the lens surface most toward the object side within the first lens group to the lens surface most toward the image side in the second lens group, and TL is the distance (back focus is an air converted length) along an optical axis from the lens surface most toward the object side within the first lens group to the imaging surface, when focused on an object at infinity.

Further, it is particularly desirable for the imaging lens of the present invention to satisfy the following conditional formula, within the range defined in Conditional Formula (5):

$$1.20 < TL/\Sigma d < 1.45 \quad (5').$$

In addition, it is desirable for the imaging lens of the present invention to satisfy the following conditional formula:

$$0.8 < |f1n|/f < 1.2 \quad (6)$$

wherein f1n is the focal length of the first lens, and f is the focal length of the entire lens system.

Further, it is particularly desirable for the imaging lens of the present invention to satisfy the following conditional formula, within the range defined in Conditional Formula (6):

$$0.82 < |f1n|/f < 1.15 \quad (6').$$

In addition, it is desirable for the imaging lens of the present invention to satisfy the following conditional formula:

$$2.0 < (R21+R12)/(R21-R12) < 4.0 \quad (7)$$

wherein R12 is the radius of curvature of the surface toward the image side of the first lens, and R21 is the radius of curvature of the surface most toward the object side of the positive lens component.

Further, it is particularly desirable for the imaging lens of the present invention to satisfy the following conditional formula, within the range defined in Conditional Formula (7):

$$2.2 < (R21+R12)/(R21-R12) < 3.8 \quad (7').$$

In addition, it is desirable for the 22 lens group to be constituted by three lenses, which are a negative lens, a negative lens, and a positive lens, provided in this order from the object side.

It is desirable for the 12 lens group to be constituted only by a single positive lens.

Meanwhile, an imaging apparatus of the present invention is equipped with an imaging lens of the present invention as described above.

As described above, the imaging lens of the present invention is constituted by the first lens group having a negative or a positive refractive power, the aperture stop, and the second lens group having a positive refractive power, provided in this order from the object side. In addition, the first lens group is provided with the 11 lens group having a negative refractive power, constituted by the single first lens, and the 12 lens group, which is a positive lens component being a single lens or a cemented lens, at a spatial interval from the first lens. That is, the first lens group has a longer focal length as a whole than the focal length of the entire lens system and a weaker power. Therefore, the first lens group may be considered as constituting a simplified wide conversion lens that functions to shorten the focal length of the entire lens system. Meanwhile, the second lens group is constituted by the 21 lens group having a positive refractive power and the 22 lens group having a negative refractive power, as a whole.

That is, the imaging lens of the present invention is of a configuration, in which the first lens group, which may be considered to be a simplified wide conversion lens, is added to the second lens group, which may be considered to be a master lens section of a lens system having a telephoto type power arrangement, in which a front group has a positive refractive power and a rear group has a negative refractive power.

It is desirable for a negative lens group to be the leading lens group in order to widen the angle of view. However, if the lens configuration is of the retro focus type, the total length of the lens system will become long. Inversely, if a positive lens group is the leading lens group, correcting off axis aberrations will become extremely difficult if a widening of the angle of view is attempted, although achieving a thin configuration is facilitated. The imaging lens of the present invention is of a configuration which is a cross of these two configurations. That is, the imaging lens of the present invention is of a configuration in which a simplified wide conversion section, which is not too thick, is provided toward the object side of a telephoto master lens section. Therefore, miniaturization and widening of the angle of view can both be realized.

Alternatively, it can be said that the imaging lens of the present invention has a lens configuration in which the arrangement of powers is optimized with respect to a sufficiently necessary amount of back focus in an imaging apparatus that does not require a back focus as long as that for an exchangeable lens of a single reflex camera, but only a certain degree of back focus.

Next, the advantageous effects obtained by satisfying Conditional Formulae (1) through (3) will be described. Conditional Formula (1) defines conditions for favorably correcting various aberrations, by configuring the first lens group to be a weak dispersing system or a weak converging system. That is, if the positive power of the first lens group becomes strong to a degree that the value of f/f1 is greater than the upper limit defined in Conditional Formula 1, correction of comatic aberrations will become difficult, or securing a necessary amount of back focus will become difficult. Inversely, if the negative power of the first lens group becomes strong to a degree that the value of f/f1 is less than the lower limit defined in Conditional Formula (1), the dispersive properties thereof will cause distortion to be generated. If the distortion is to be suppressed, correction of field curvature will become difficult. The above shortcomings can be prevented if Conditional Formula (1) is satisfied, and various aberrations can be favorably corrected.

Conditional Formula (2) defines the relationship between the spatial distance between the first lens, which is the negative lens provided within the first lens group, and the positive lens component provided more toward the image side therefrom, and the focal distance of the entire lens system. If the value of d12/f is greater than the upper limit defined in Conditional Formula (2), it will be advantageous from the viewpoint of correcting spherical aberration and comatic aberration. However, such a configuration is not preferable because the first lens group as a whole will become thick. Inversely, if the value of d12/f is less than the lower limit defined in Conditional Formula (2), it will be disadvantageous from the viewpoint of correcting the aforementioned aberrations. In addition, the intensity of ghost light, which is generated by light being reflected at the image side lens surface of the first lens and the object side lens surface of the positive lens component, will become strong, which is not preferable. The above shortcomings can be prevented if Conditional Formula (2) is satisfied, and various aberrations can be favorably corrected.

Conditional Formula (3) defines the relationship between the total length of the optical system and the maximum image height. If the value of TL/Y is greater than the upper limit defined in Conditional Formula (3) it will be advantageous from the view point of correcting aberrations. However, the size of the lens system as a whole will become large, which is not preferable from the viewpoint of miniaturization. Inversely, if the value of TL/Y is less than the lower limit defined in Conditional Formula (3), correction of spherical aberration and field curvature will become difficult in the lens system as a whole, which is not preferable. The above shortcomings can be prevented if Conditional Formula (3) is satisfied. That is, various aberrations can be favorably corrected, and miniaturization becomes possible.

The advantageous effects described above, which are obtained by satisfying Conditional Formulae (1) through (3), will become more prominent if at least one of Conditional Formulae (1') through (3') is satisfied within the ranges defined in Conditional Formulae (1) through (3). Various aberrations can be even more favorably corrected, particularly in the case that Conditional Formula (1") is satisfied.

The imaging lens of the present invention may be of a configuration, wherein the 22 lens group is constituted only by a sub lens group having a negative refractive power and a single positive lens, provided in this order from the object side. In this case, it becomes possible for the positive lens to suppress the incident angle of off axis light rays that enter an imaging device.

In addition, the following advantageous effects can be obtained in the case that the imaging lens of the present invention satisfies Conditional Formula (4). That is, Conditional Formula (4) defines the average value of the refractive indices of all of the lenses within the 22 lens group. If the value of Nd22 is less than the lower limit defined in Conditional Formula (4), control of the Petzval sum will become difficult, resulting in correction of field curvature becoming difficult, which is not preferable. The above shortcoming can be prevented if Conditional Formula (4) is satisfied, and it will be possible to favorably correct field curvature.

The above advantageous effect will become more prominent particularly in the case that Conditional Formula (4') is satisfied within the range defined by Conditional Formula (4).

The imaging lens of the present invention may adopt a configuration, wherein a lens having at least one surface which is aspherical surface is provided within the 22 lens group. In this case, control of the balance of spherical aberration and field curvature is facilitated, while thinning the imaging lens as a whole is facilitated.

The imaging lens of the present invention may adopt a configuration, wherein a negative lens having a surface toward the object side which is concave toward the object side in a paraxial region, and of which at least one surface is an aspherical surface, is provided within the 22 lens group. In this case, a great aberration correcting effect can be obtained by providing the aspherical surface on the negative lens, at which the angles of incident light rays tend to change greatly when miniaturized.

The imaging lens of the present invention may adopt a configuration, wherein the 21 lens group is constituted by a total of three lenses, which are a positive lens and a negative lens cemented together, and a single positive lens. In this case, it will become possible to favorably correct chromatic aberration by the operation of the cemented lens. In addition, this configuration is advantageous from the viewpoint of correcting spherical aberration, because the positive lens is provided within the 21 lens group, which is provided immediately behind the aperture stop.

Note that in the case that the 21 lens group is constituted by the above three lenses, it is preferable for a negative lens, a positive lens, and a positive lens to be provided in this order from the object side, the negative lens and the positive lens toward the object side being cemented together. The Petzval sum can be more easily suppressed by providing the negative lens most toward the object side. This configuration is disadvantageous from the viewpoint of correcting spherical aberration, but spherical aberration can be favorably corrected by providing the separate positive single lens in addition to the two lenses which were cemented together.

The effect of correcting spherical aberration and comatic aberration can be increased in the case that a positive lens having at least one aspherical surface is provided in the 21 lens group.

In addition, the following advantageous effects can be obtained in the case that the imaging lens of the present invention satisfies Conditional Formula (5). That is, Conditional Formula (5) defines the relationship between the distance along the optical axis from the lens surface most toward the object side within the first lens group to the lens surface most toward the image side in the second lens group and the distance along the optical axis from the lens surface most toward the object side within the first lens group to the imaging surface. If the value of TL/Σd is greater than the upper limit defined in Conditional Formula (5), the lens system as a whole becomes large, and realizing both miniaturization and high performance will become difficult. Inversely, if the value of TL/Σd is less than the lower limit defined in Conditional Formula (5), it will become difficult to correct spherical aberration and field curvature in a balanced manner, and further, it will become difficult to secure a necessary amount of back focus. The above shortcomings can be prevented if Conditional Formula (5) is satisfied. That is, both miniaturization and high performance can be realized, spherical aberration and field curvature can be corrected in a balanced manner, and securing a desired amount of back focus will be facilitated.

The above advantageous effects will become more prominent in the case that Conditional Formula (5') is satisfied within the range defined in Conditional Formula (5).

In addition, the following advantageous effects can be obtained in the case that the imaging lens of the present invention satisfies Conditional Formula (6). That is, Conditional Formula (6) defines the relationship between the focal length of the first lens and the focal length of the entire system. If the value of |f1n|/f is less than the lower limit defined in Conditional Formula (6) and the negative power of the first lens group becomes strong, field curvature and the Petzval sum will increase in the negative direction. Inversely, if the value of |f1n|/f is greater than the upper limit defined in Conditional Formula (6), it will become difficult to correct comatic aberration, and also become difficult to secure a desired amount of back focus. The above shortcomings can be prevented if Conditional Formula (6) is satisfied. That is, field curvature and the Petzval sum can be suppressed, comatic aberration can be favorably corrected, and further, securing a desired amount of back focus will be facilitated.

The above advantageous effects will become more prominent in the case that Conditional Formula (6') is satisfied within the range defined in Conditional Formula (6).

In addition, the following advantageous effects can be obtained in the case that the imaging lens of the present invention satisfies Conditional Formula (7). That is, Conditional Formula (7) defines the relationship between the radius of curvature of the surface toward the image side of the first lens, and the radius of curvature of the surface most toward the object side of the positive lens component provided with a spatial interval from the first lens. If the value of (R21+R12)/(R21−R12) is greater than the upper limit defined in Conditional Formula (7), the amounts of distortion and field curvature will become great, which is not preferable. Inversely, if the value of (R21+R12)/(R21−R12) is less than the lower limit defined in Conditional Formula (7), it will become difficult to correct comatic aberrations, which is also not preferable. The above shortcomings can be prevented if Conditional Formula (7) is satisfied. That is, distortion and field curvature can be suppressed, and correction of comatic aberration will be facilitated.

The above advantageous effects will become more prominent in the case that Conditional Formula (7') is satisfied within the range defined in Conditional Formula (7).

The imaging lens of the present invention may adopt a configuration, wherein the 22 lens group is constituted by three lenses, which are a negative lens, a negative lens, and a positive lens, provided in this order from the object side. This configuration is particularly advantageous from the viewpoint of miniaturization.

Further, the imaging lens of the present invention may adopt a configuration, wherein the 12 lens group is constituted only by a single positive lens. This configuration is also advantageous from the viewpoint of miniaturization.

Meanwhile, an imaging apparatus of the present invention is equipped with the imaging lens of the present invention that exhibits the advantageous effects described above. Therefore, the imaging apparatus of the present invention can perform imaging at a wide angle of view and achieve reductions in size and weight.

BRIEF DESCRIPTION OF THE DRAWINGS

FIG. 1 is a sectional diagram that illustrates the lens configuration of an imaging lens according to Example 1 of the present invention.

FIG. 2 is a sectional diagram that illustrates the lens configuration of an imaging lens according to Example 2 of the present invention.

FIG. 7 is a sectional diagram that illustrates the lens configuration of an imaging lens according to Example 7 of the present invention.

FIG. 8 is a sectional diagram that illustrates the lens configuration of an imaging lens according to Example 8 of the present invention.

Figure 10:
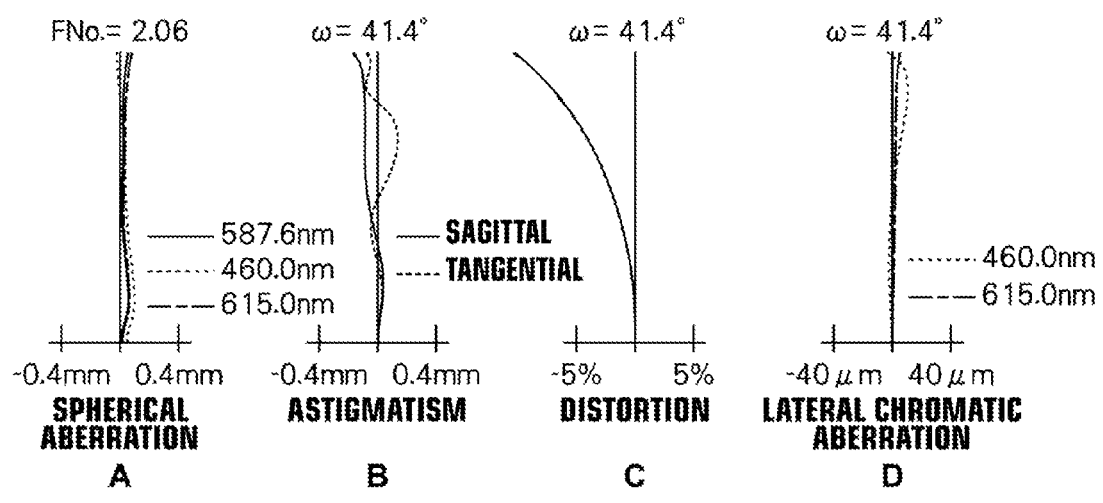

A through D of FIG. 10 are diagrams that illustrate aberrations of the imaging lens according to Example 1 of the present invention.

Figure 11:
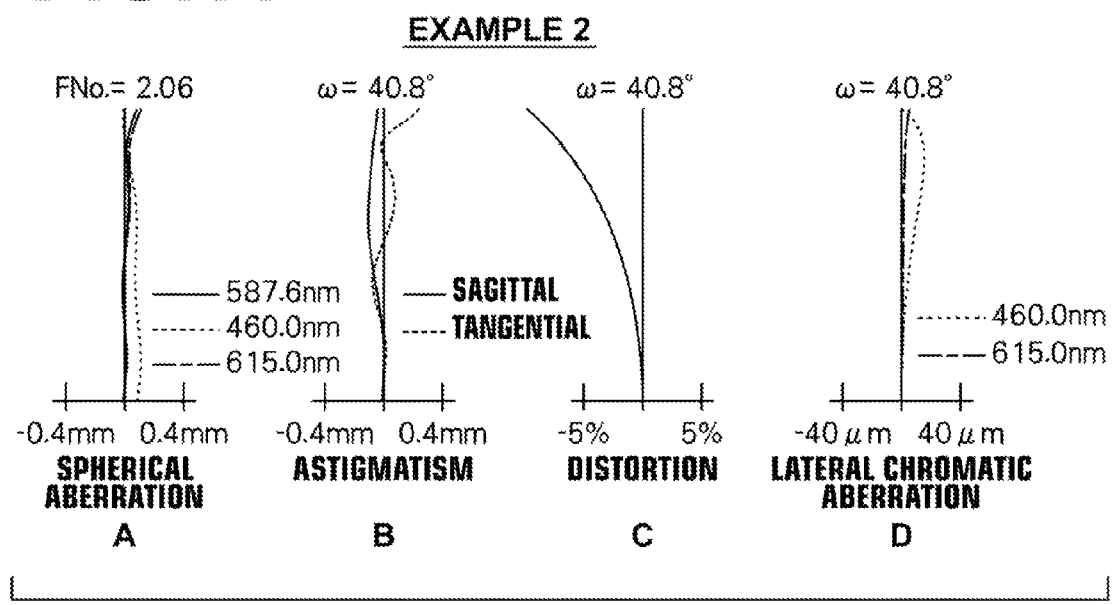

A through D of FIG. 11 are diagrams that illustrate aberrations of the imaging lens according to Example 2 of the present invention.

Figure 12:
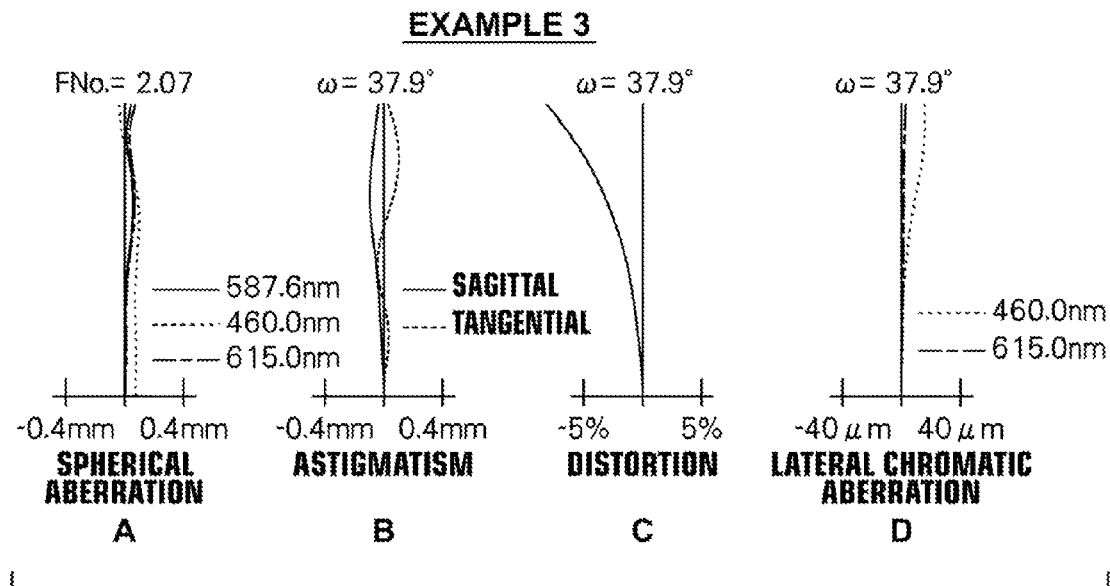

A through D of FIG. 12 are diagrams that illustrate aberrations of the imaging lens according to Example 3 of the present invention.

Figure 13:
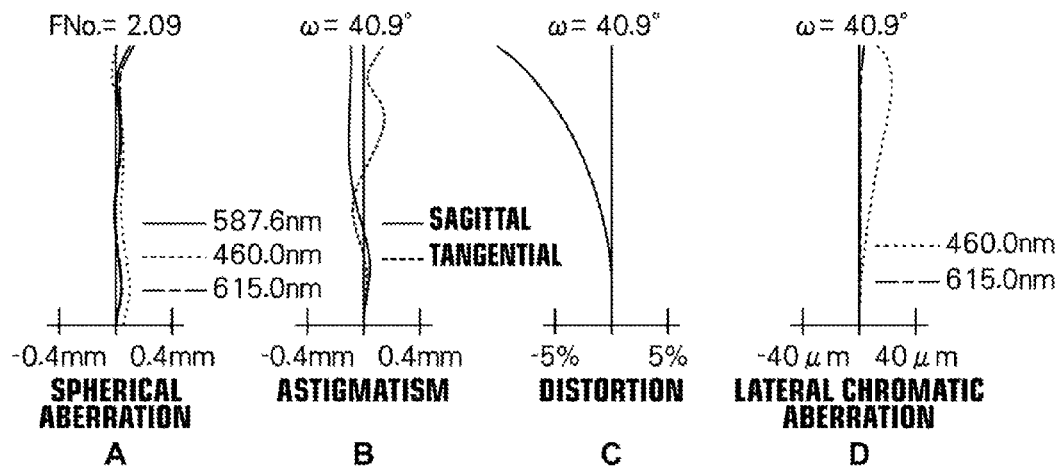

A through D of FIG. 13 are diagrams that illustrate aberrations of the imaging lens according to Example 4 of the present invention.

Figure 14:
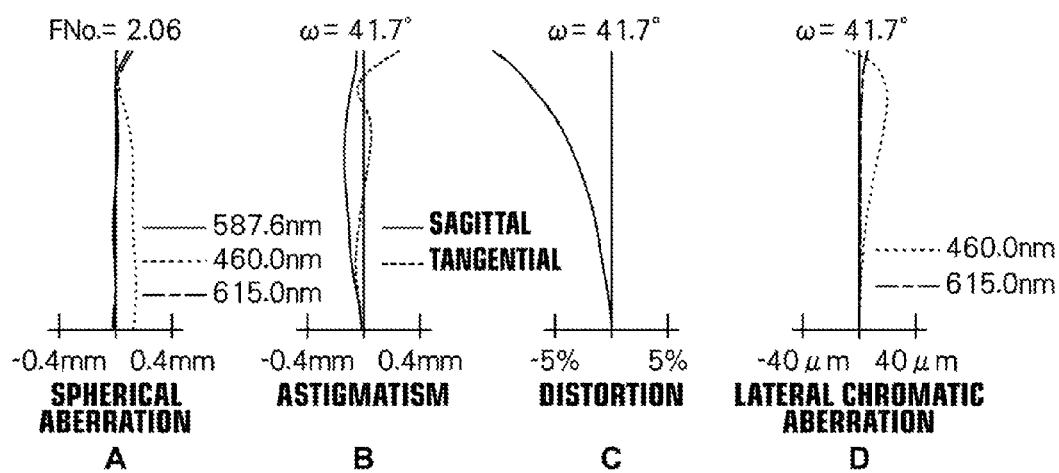

A through D of FIG. 14 are diagrams that illustrate aberrations of the imaging lens according to Example 5 of the present invention.

Figure 15:
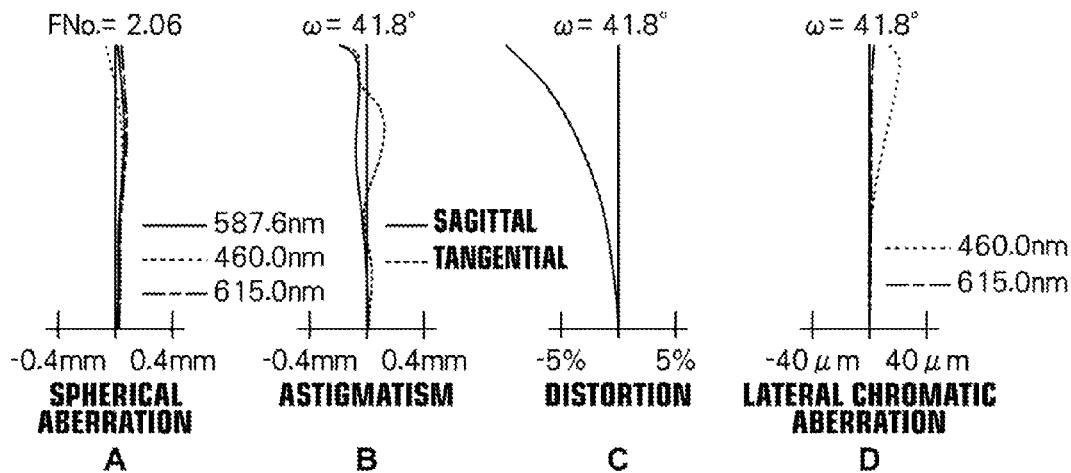

A through D of FIG. 15 are diagrams that illustrate aberrations of the imaging lens according to Example 6 of the present invention.

Figure 16:
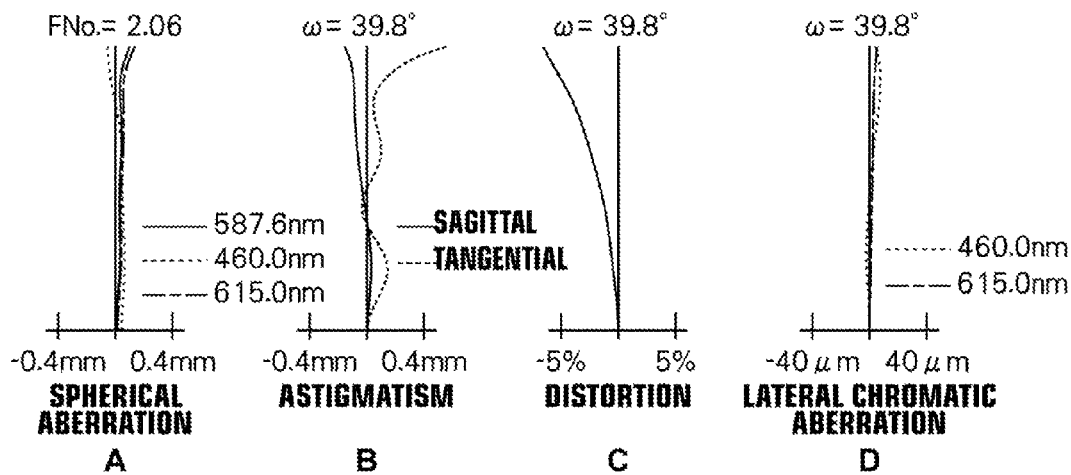

A through D of FIG. 16 are diagrams that illustrate aberrations of the imaging lens according to Example 7 of the present invention.

Figure 17:
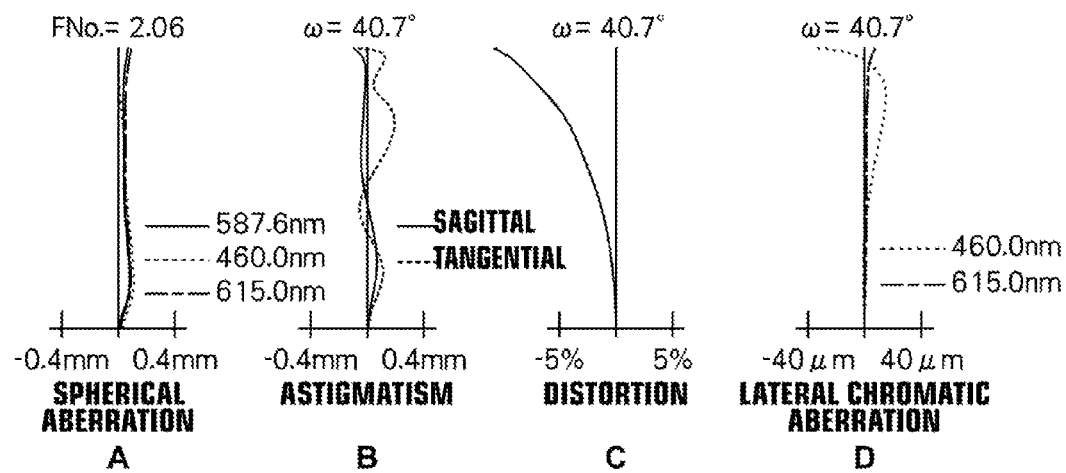

A through D of FIG. 17 are diagrams that illustrate aberrations of the imaging lens according to Example 8 of the present invention.

Figure 18:
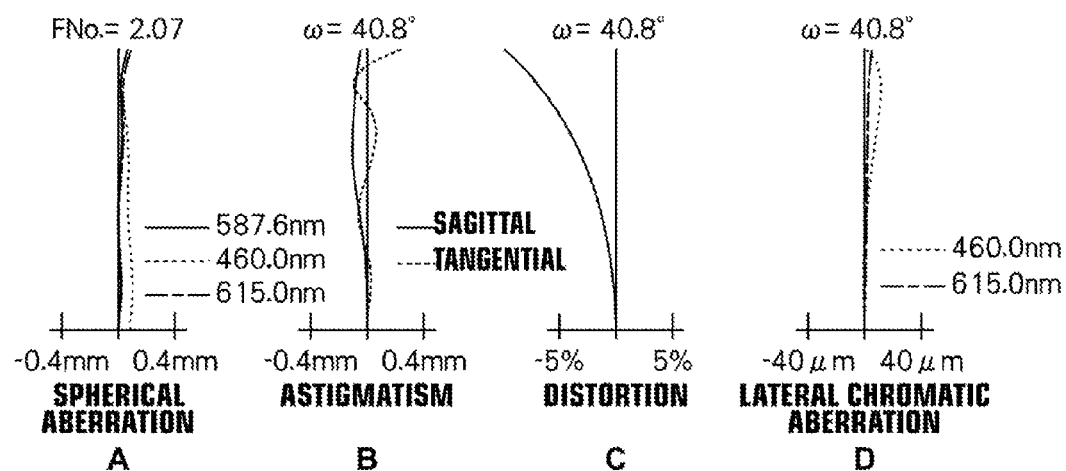

A through D of FIG. 18 are diagrams that illustrate aberrations of the imaging lens according to Example 9 of the present invention.

Figure 19:
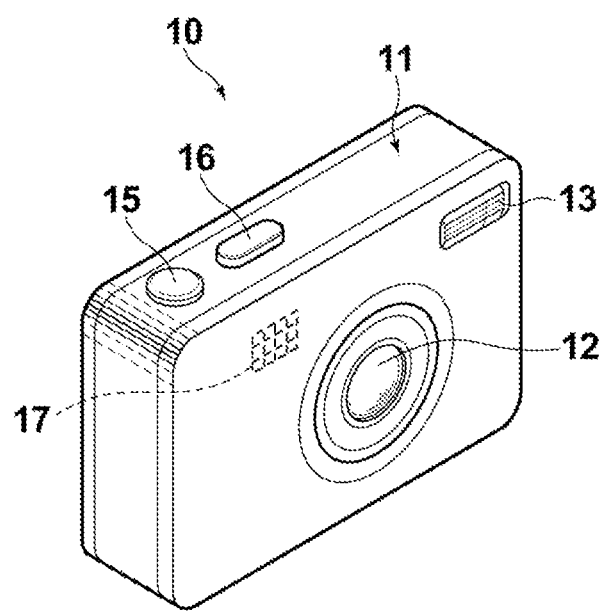

FIG. 19 is a diagram that schematically illustrates the configuration of an imaging apparatus according to an embodiment of the present invention.

Figure 20A:
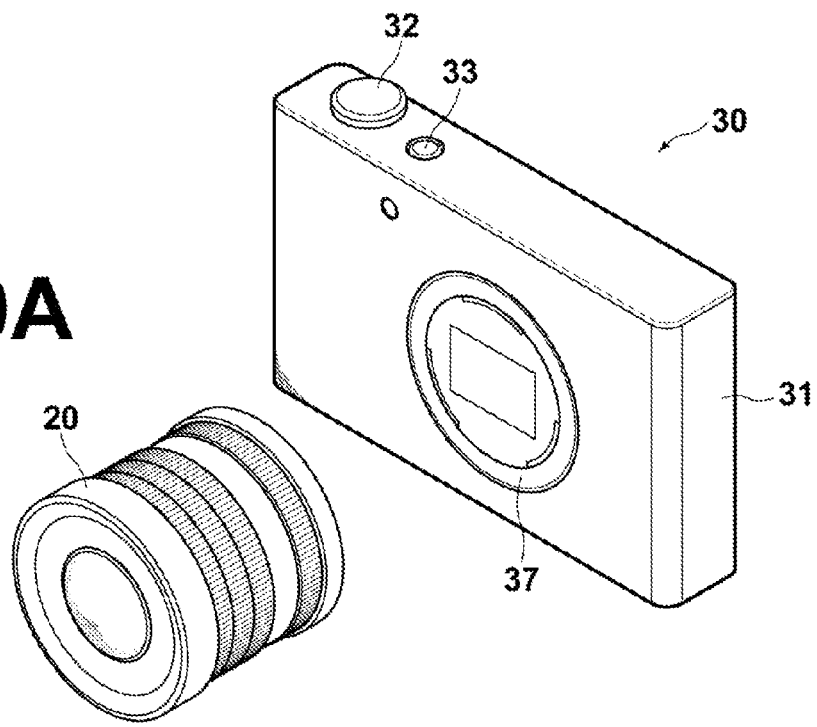

FIG. 20A is a schematic front view that illustrates an imaging apparatus according to another embodiment of the present invention.

Figure 20B:
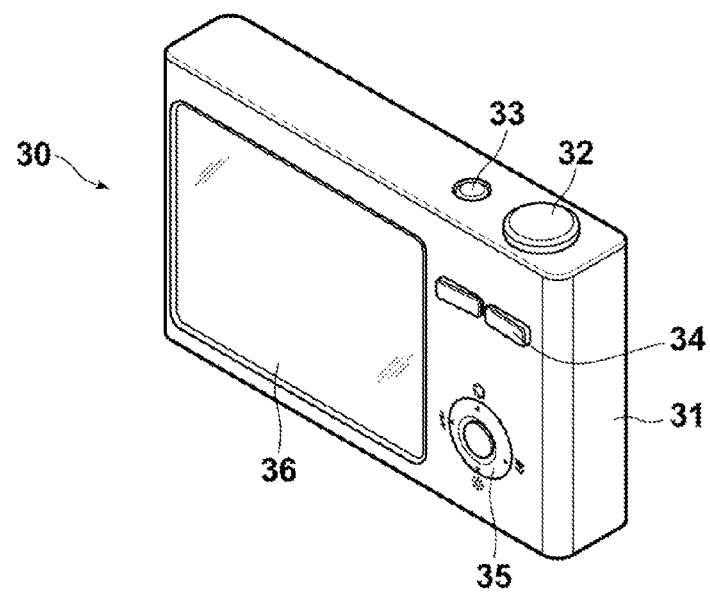

FIG. 20B is a schematic rear view of the imaging apparatus illustrated in FIG. 20A.

BEST MODE FOR CARRYING OUT THE INVENTION

Hereinafter, embodiments of the present invention will be described in detail with reference to the attached drawings. FIG. 1 is a cross sectional diagram that illustrates the configuration of a imaging lens according to an embodiment of the present invention, and corresponds to a imaging lens of Example 1 to be described later. FIG. 2 through FIG. 9 are cross sectional diagrams that illustrate configurations of imaging lenses according to other embodiments of the present invention, and correspond to imaging lenses of Examples 2 through 9 to be described later. The basic configurations of the embodiments illustrated in FIG. 1 through FIG. 9 are the same except that a first lens group G1 is constituted by three lenses in the embodiment illustrated in FIG. 9. The manners in which the configurations are illustrated are also the same. Therefore, the imaging lenses according to the embodiments of the present invention will be described mainly with reference to FIG. 1.

In FIG. 1, the left side is the object side and the right side is the image side. FIG. 1 illustrates the arrangement of the optical system in a state focused on infinity. The same applies to FIGS. 2 through 9 to be described later.

The imaging lens of the present embodiment is constituted by: a first lens group G1 having a negative or a positive refractive power; and a second lens group G2 having a positive refractive power, provided in this order from the object side as lens groups. Note that an aperture stop St is provided between the first lens group G1 and the second lens group G2.

The first lens group G1 is constituted by an 11 lens group G11 having a negative refractive power and a 12 lens group G12 having a positive refractive power, provided in this order from the object side. The first lens group G1 is constituted by 3 or fewer lenses in total. In the present embodiment, the 11 lens group G11 is constituted by a single first lens L1, which is a negative lens (a lens having a negative refractive power), and the 12 lens group G12 is constituted by a single second lens L2, which is a positive lens (a lens having a positive refractive power).

Note that 12 lens groups G12 have the same configuration in Examples 2 through 8 to be described later. In contrast, a 12 lens group G12 of Example 9 is constituted by a positive lens L2a and a negative lens L2b, which are cemented together. The cemented lens formed by the lenses L2a and L2b has a positive refractive power. In the present invention, such a cemented lens and the second lens L2, which is a single lens having a positive refractive power, are collectively referred to as a "positive lens component".

Meanwhile, the second lens group G2 is constituted by a 21 lens group G21 having a positive refractive power, and a 22 lens group G22 having a negative refractive power, provided in this order from the object side. Both of the 21 lens group G21 and the 22 lens group G22 include at least one positive lens and at least one negative lens. In the present embodiment, the 21 lens group G21 is constituted by a third lens L3, which is a negative lens, a fourth lens L4, which is a positive lens cemented to the third lens L3, and a fifth lens L5, which is a positive lens, provided in this order from the object side. Meanwhile, the 22 lens group G22 is constituted by a sixth lens L6, which is a negative lens, a seventh lens L7, which is also a negative lens, and an eighth lens L8, which is a positive lens, provided in this order from the object side.

The aperture stop St illustrated in FIG. 1 does not necessarily represent the size or shape thereof, but only the position thereof on an optical axis Z. In addition, Sim illustrated in FIG. 1 is an imaging surface, and an imaging device, such as a CCD (Charge Coupled Device) and a CMOS (Complementary Metal Oxide Semiconductor), is provided at the imaging surface, as will be described later.

In addition, FIG. 1 illustrates an example in which a parallel plate optical member PP is provided between the second lens group G2 and the imaging surface Sim. When the imaging lens is applied to an imaging apparatus, a cover glass and various filter, such as an infrared ray cutoff filter and a low pass filter, are often provided between the optical system and the imaging surface Sim, according to the configuration of an imaging apparatus on which the lens is to be mounted. The optical member PP is provided assuming the presence of the cover glass, the various types of filters, and the like. In addition, recent imaging apparatuses employ the 3 CCD format, in which CCD's are employed for each color in order to improve image quality. In order to be compatible with the 3 CCD format, a color separating optical system such as a color separating prism may be inserted between the lens system and the imaging surface Sim. In this case, a color separating optical system may be provided as the optical member PP.

In the imaging lens of the present embodiment, focusing is performed by moving the entirety of the optical system along the optical axis Z.

Hereinafter, details of the lenses that constitute each of the lens groups will be described. As an example, the first lens is a biconcave lens, the second lens L2 is a planoconvex lens having a convex surface toward the object side (the left side in FIG. 1), the third lens L3 is a negative meniscus lens having a concave surface toward the image side (that is, the side of the imaging surface Sim toward the right side in FIG. 1), the fourth lens L4 is a biconvex lens, the fifth lens L5 is a biconvex lens, the sixth lens L6 is a planoconcave lens having a concave surface toward the image side, the seventh lens L7 is a negative meniscus lens having a concave surface toward the object side, and the eighth lens L8 is a biconvex lens.

The imaging lens of the present embodiment is of a configuration, in which the first lens group G1, which may be considered to be a simplified wide conversion lens, is added to the second lens group G2, which may be considered to be a master lens section of a lens system having a telephoto type power arrangement, in which a front group (the 21 lens group G21) has a positive refractive power and a rear group (the 22 lens group G22) has a negative refractive power. Thereby, the present imaging lens is capable of realizing both miniaturization and widening of the angle of view.

In addition, the present imaging lens satisfies all of the following conditional formulae:

$$-0.50 < f/f1 < 0.20 \quad (1)$$

$$0.08 < d12/f < 0.35 \quad (2)$$

$$2.5 < TL/Y < 4.0 \quad (3)$$

wherein f is the focal length of the entire lens system, f1 is the focal length of the first lens group G1, d12 is a distance along an optical axis from the lens surface toward an image side of the first lens L1 within the first lens group G1 to the lens surface most toward the object side of the second lens L2 as a positive lens component, TL is the distance along the optical axis from the lens surface most toward the object side within the first lens group G1, that is, the lens surface of the first lens L1 toward the object side, to the imaging surface Sim (back focus is an air converted length), and Y is a maximum image height, when focused on an object at infinity. Further, all of the following conditional formulae are satisfied within the ranges defined in Conditional Formulae (1) through (3):

$$-0.45 < f/f1 < 0.15 \quad (1')$$

$$0.10 < d12/f < 0.32 \quad (2')$$

$$1.7 < TL/Y < 3.8 \quad (3').$$

Further, the following conditional formula is satisfied within the range defined in Conditional Formula (1) or Conditional Formula (1'):

$$-0.42 < f/f1 < 0.10 \quad (1'').$$

Note that the conditions defined by Conditional Formulae (1) through (3), that is the specific values of the equations therein, are collectively shown for each Example in Table 19. This also applies to Conditional (4) through (7) to be described later.

The imaging lens of the present embodiment exhibits the following advantageous effects, by satisfying all of Conditional Formulae (1) through (3). That is, Conditional Formula (1) defines conditions for favorably correcting various aberrations, by configuring the first lens group G1 to be a weak dispersing system or a weak converging system. That is, if the positive power of the first lens group becomes strong to a degree that the value of f/f1 is greater than the upper limit defined in Conditional Formula 1, correction of comatic aberrations will become difficult, or securing a necessary amount of back focus will become difficult. Inversely, if the negative power of the first lens group becomes strong to a degree that the value of f/f1 is less than the lower limit defined in Conditional Formula (1), the dispersive properties thereof will cause distortion to be generated. If the distortion is to be suppressed, correction of field curvature will become difficult. The above shortcomings can be prevented if Conditional Formula (1) is satisfied, and various aberrations can be favorably corrected.

Conditional Formula (2) defines the relationship between the spatial distance between the first lens L1, which is the negative lens provided within the first lens group G1, and the second lens L2, which is the positive lens component provided more toward the image side therefrom, and the focal distance of the entire lens system. If the value of d12/f is greater than the upper limit defined in Conditional Formula (2), it will be advantageous from the viewpoint of correcting spherical aberration and comatic aberration. However, such a configuration is not preferable because the first lens group G1 as a whole will become thick. Inversely, if the value of d12/f is less than the lower limit defined in Conditional Formula (2), it will be disadvantageous from the viewpoint of correcting the aforementioned aberrations. In addition, the intensity of ghost light, which is generated by light being reflected at the image side lens surface of the first lens L1 and the object side lens surface of the second lens L2, will become strong, which is not preferable. The above shortcomings can be prevented if Conditional Formula (2) is satisfied, and various aberrations can be favorably corrected.

Conditional Formula (3) defines the relationship between the total length of the optical system and the maximum image height. If the value of TL/Y is greater than the upper limit defined in Conditional Formula (3) it will be advantageous from the view point of correcting aberrations. However, the size of the lens system as a whole will become large, which is not preferable from the viewpoint of miniaturization.

Inversely, if the value of TL/Y is less than the lower limit defined in Conditional Formula (3), correction of spherical aberration and field curvature will become difficult in the lens system as a whole, which is not preferable. The above shortcomings can be prevented if Conditional Formula (3) is satisfied. That is, various aberrations can be favorably corrected, and miniaturization becomes possible.

The imaging lens of the present embodiment satisfies all of Conditional Formulae (1') through (3'), and further satisfies Conditional Formula (1") within the ranges defined in Conditional Formulae (1) through (3). Therefore, the above advantageous effects are exhibited more prominently. Note that it is not necessary for all of Conditional Formulae (1') through (3') to be satisfied, and the above advantageous effects will become more prominent if at least one of Conditional Formulae (1') through (3') is satisfied.

The imaging lens of the present embodiment is of a configuration, wherein the 22 lens group G22 is constituted only by a sub lens group (constituted by the sixth lens L6 and the seventh lens L7) having a negative refractive power and the eighth lens L8, which is a single positive lens, provided in this order from the object side. In this configuration, it becomes possible for the eighth lens L8, which is a positive lens, to suppress the incident angle of off axis light rays that enter the imaging device.

In addition, the imaging lens of the present embodiment satisfies the following conditional formula:

$$1.75 < Nd22 \quad (4)$$

wherein Nd22 is the average value of the refractive indices of all of the lenses within the 22 lens group G22, that is, the sixth lens L6, the seventh lens L7, and the eighth lens L8, with respect to the d line. Further, the imaging lens of the present embodiment satisfies the following conditional formula, within the range defined in Conditional Formula (4) (refer to Table 19):

$$1.78 < Nd22 \quad (4').$$

The following advantageous effects are obtained because the imaging lens of the present embodiment satisfies Conditional Formula (4). That is, Conditional Formula (4) defines the average value of the refractive indices of all of the lenses within the 22 lens group G22. If the value of Nd22 is less than the lower limit defined in Conditional Formula (4), control of the Petzval sum will become difficult, resulting in correction of field curvature becoming difficult, which is not preferable. The above shortcoming can be prevented if Conditional Formula (4) is satisfied, and it will be possible to favorably correct field curvature.

The above advantageous effect are more prominent in the imaging lens of the present embodiment, because Conditional Formula (4') is satisfied within the range defined by Conditional Formula (4).

In addition, the seventh lens L7 having aspherical surfaces at both the object side and at the image side is provided within the 22 lens group G22 in the imaging lens of the present embodiment. The imaging lens can be formed to be thin as a whole, while the balance of spherical aberration and field curvature can be controlled easily, by providing the seventh lens L7 configured in this manner within the 22 lens group G22.

In greater detail, the seventh lens L7 lens has a surface toward the object side which is concave toward the object side in a paraxial region, and aspherical surfaces both at the object side and at the image side. The incident angles of light rays that enter the seventh lens L7 tend to change greatly when attempting miniaturization. However, a great aberration correcting effect can be obtained by the seventh lens L7 having the shape described above.

In the imaging lens of the present embodiment, the 21 lens group G21 is constituted by a total of three lenses, which are a positive lens and a negative lens (the third lens L3 and the fourth lens L4) cemented together, and a single positive lens (the fifth lens L5). In this case, it will become possible to favorably correct chromatic aberration by the operation of the cemented lens formed by the third lens L3 and the fourth lens L4. In addition, this configuration is advantageous from the viewpoint of correcting spherical aberration, because the positive lens is provided within the 21 lens group G21, which is provided immediately behind the aperture stop.

In addition, the 21 lens group is constituted by a negative lens (the third lens L3), a positive lens (the fourth lens L4), and a positive lens (the fifth lens L5) to be provided in this order from the object side, the negative lens (the third lens L3) and the positive lens toward the object side (the fourth lens L4) being cemented together. The Petzval sum can be more easily suppressed by providing the negative lens most toward the object side. This configuration is disadvantageous from the viewpoint of correcting spherical aberration, but spherical aberration can be favorably corrected by providing the separate positive single lens, that is, the fifth lens L5, in addition to the two lenses L3 and L4 which were cemented together.

In the imaging lens of the present embodiment, the 21 lens group G21 is provided with the fifth lens L5, which is a positive lens having aspherical surfaces both toward the object side and toward the image side. The effect of correcting spherical aberration and comatic aberration is increased, by the fifth lens L5 having such a configuration being provided in the 21 lens group G21. In addition, the imaging lens of the present embodiment satisfies the following conditional formula:

$$1.1 < TL/\Sigma d < 1.5 \quad (5)$$

wherein $\Sigma d$ is the distance along the optical axis from the lens surface toward the object side of the first lens L1 to the lens surface toward the image side of the eighth lens L8, and TL is the distance (back focus is an air converted length) along the optical axis from the lens surface toward the object side of the first lens L1 to the imaging surface Sim, when focused on an object at infinity. Further, the imaging lens of the present embodiment satisfies the conditional formula below within the range defined in Conditional Formula (5) (refer to Table 19):

$$1.20 < TL/\Sigma d < 1.45 \quad (5').$$

The imaging lens of the present embodiment satisfies Conditional Formula (5), and therefore exhibits the following advantageous effects. That is, Conditional Formula (5) defines the relationship between the distance along the optical axis from the lens surface most toward the object side within the first lens group G1 to the lens surface most toward the image side in the second lens group G2 and the distance along the optical axis from the lens surface most toward the object side within the first lens group G1 to the imaging surface Sim. If the value of $TL/\Sigma d$ is greater than the upper limit defined in Conditional Formula (5), the lens system as a whole becomes large, and realizing both miniaturization and high performance will become difficult. Inversely, if the value of $TL/\Sigma d$ is less than the lower limit defined in Conditional Formula (5), it will become difficult to correct spherical aberration and field curvature in a balanced manner, and further, it will become difficult to secure a necessary amount of back focus. The above shortcomings can be prevented if Conditional Formula (5) is satisfied. That is, both miniaturization and high performance can be realized, spherical aberration and field curvature can be corrected in a balanced manner, and securing a desired amount of back focus will be facilitated.

The imaging lens of the present embodiment satisfies Conditional Formula (5') within the range defined in Conditional Formula (5). Therefore, the above advantageous effects are more prominent.

The imaging lens of the present embodiment satisfies the following conditional formula:

$$0.8 < |f1n|/f < 1.2 \quad (6)$$

wherein f1n is the focal length of the first lens L1 and f is the focal length of the entire system. Further, the imaging lens of the present embodiment satisfies the following conditional formula within the range defined in Conditional Formula (6) (refer to Table 19):

$$0.82 < |f1n|/f < 1.15 \quad (6').$$

The imaging lens of the present embodiment satisfies Conditional Formula (6), and therefore exhibits the following advantageous effects. That is, Conditional Formula (6) defines the relationship between the focal length of the first lens L1 and the focal length of the entire system. If the value of $|f1n|/f$ is less than the lower limit defined in Conditional Formula (6) and the negative power of the first lens group G1 becomes strong, field curvature and the Petzval sum will increase in the negative direction. Inversely, if the value of |f1n|/f is greater than the upper limit defined in Conditional Formula (6), it will become difficult to correct comatic aberration, and also become difficult to secure a desired amount of back focus. The above shortcomings can be prevented if Conditional Formula (6) is satisfied. That is, field curvature and the Petzval sum can be suppressed, comatic aberration can be favorably corrected, and further, securing a desired amount of back focus will be facilitated.

The imaging lens of the present embodiment satisfies Conditional Formula (6') within the range defined in Conditional Formula (6). Therefore, the above advantageous effects are more prominent.

In addition, the imaging lens of the present embodiment satisfies the following Conditional Formula:

$$2.0<(R21+R12)/(R21-R12)<4.0 \quad (7)$$

wherein R12 is the radius of curvature of the surface toward the image side of the first lens L1, and R21 is the radius of curvature of the surface most toward the object side of the second lens L2, which is the positive lens component. Further, the imaging lens of the present embodiment satisfies the following conditional formula within the range defined in Conditional Formula (7) (refer to Table 19):

$$2.2<(R21+R12)/(R21-R12)<3.8 \quad (7').$$

The imaging lens of the present embodiment satisfies Conditional Formula (7), and therefore exhibits the following advantageous effects. That is, Conditional Formula (7) defines the relationship between the radius of curvature of the surface toward the image side of the first lens L1, and the radius of curvature of the surface most toward the object side of the second lens L2, which is the positive lens component provided with a spatial interval from the first lens L1. If the value of (R21+R12)/(R21-R12) is greater than the upper limit defined in Conditional Formula (7), the amounts of distortion and field curvature will become great, which is not preferable. Inversely, if the value of (R21+R12)/(R21-R12) is less than the lower limit defined in Conditional Formula (7), it will become difficult to correct comatic aberrations, which is also not preferable. The above shortcomings can be prevented if Conditional Formula (7) is satisfied. That is, distortion and field curvature can be suppressed, and correction of comatic aberration will be facilitated.

The imaging lens of the present embodiment satisfies Conditional Formula (7') within the range defined in Conditional Formula (7). Therefore, the above advantageous effects are more prominent.

In the imaging lens of the present embodiment, the 22 lens group G22 is constituted by three lenses, which are the sixth lens L6 as a negative lens, the seventh lens L7 as a negative lens, and the eighth lens L8 as a positive lens, provided in this order from the object side. Adopting a configuration in which the 22 lens group G22 is constituted only by three lenses is particularly advantageous from the viewpoint of miniaturization.

In addition, in the imaging lens of the present embodiment, the 11 lens group G11 is constituted only by the first lens L1, which is a negative single lens, and the 12 lens group G12 is constituted only by the second lens L2, which is a positive single lens. Such a configuration is also advantageous from the viewpoint of miniaturization.

Next, Examples of the imaging lens of the present invention, and particularly examples of numerical values, will be described in detail.

Example 1

As described previously, the arrangement of the lens groups within the imaging lens of Example 1 is illustrated in FIG. 1. Note that the details of the lens groups and each lens in the configuration of FIG. 1 have been described previously. Therefore, redundant descriptions will be omitted below, unless particularly necessary.

Table 1 shows basic lens data of the imaging lens of Example 1. Table 1 also shows data regarding the optical member PP. In Table 1, ith (i=1, 2, 3, . . . ) lens surface numbers that sequentially increase from the object side to the image side, with the lens surface at the most object side designated as first, are shown in the column Si. The radii of curvature of ith surfaces are shown in the column Ri, and the distances between an ith surface and an i+1st surface along the optical axis Z are shown in the column Di. The refractive indices of jth (j=1, 2, 3, . . . ) optical elements from the object side to the image side with respect to the d line (wavelength: 587.6 nm), j being a number that increases sequentially with the optical element most toward the object side designated as first, are shown in the column Ndj. The Abbe's numbers of the jth optical elements with respect to the d line are shown in the column vdj. Note that the aperture stop St is also included in the basic lens data, and the radius of curvature of the surface corresponding to the aperture stop St is shown as "∞" (aperture stop).

The units of the radii of curvature R and the distances D between adjacent lens surfaces are mm. Table 1 shows numerical values which are rounded to a predetermined number of digits. The signs of the radii of curvature are positive in cases that the surface shape is convex toward the object side, and negative in cases that the surface shape is convex toward the image side.

In the lens data of Table 1, surface numbers of aspherical surfaces are denoted with the mark "*", and numerical values that represent paraxial radii of curvature are shown as the radii of curvature of the aspherical surfaces. The focal length f and the F number of the entire lens system are indicated beneath Table 1.

The foregoing applies to Tables 3, 5, 9, 11, 13, 15, and 17 to be described later.

Table 2 shows aspherical surface data of the imaging lens of Example 1. In the numerical values of the aspherical surface coefficients of Table 2, "E-n (n: integer)" means "·10$^{-n}$". Note that the aspherical surface coefficients are the values of the coefficients KA and Am (m=3, 4, 5, . . . , 16) in the aspherical surface formula below.

$$Zd=C \cdot h^2/\{1+(1-KA \cdot C^2 \cdot h^2)^{1/2}\}+\Sigma Am \cdot h^m$$

herein: Zd is the depth of the aspherical surface (the length of a normal line that extends from a point on the aspherical surface having a height h to a plane perpendicular to the optical axis that contacts the peak of the aspherical surface), h is the height (the distance from the optical axis to the surface of the lens), C is the inverse of the paraxial radius of curvature, and KA and Am are aspherical surface coefficients (m=3, 4, 5, . . . , 16). The manner in which items are shown in Table 2 described above also apply to Tables 4, 6, 8, 10, 12, 14, 16, and 18 to be described later.

In all of the tables below, mm is used as the units for lengths and degrees (°) are used as units of angles. However, it is possible for optical systems to be proportionately enlarged or proportionately reduced and utilized. Therefore, other appropriate units may be used.

TABLE 1

Example 1: Basic Lens Data

| Si (Surface Number) | Ri (Radius of Curvature) | Di (Distance) | Ndj (Refractive Index) | vdj (Abbe's Number) |
|---|---|---|---|---|
| 1 | −127.7261 | 1.00 | 1.517417 | 52.43 |
| 2 | 10.3754 | 3.75 | | |
| 3 | 22.3303 | 2.40 | 1.834000 | 37.16 |
| 4 | ∞ | 2.51 | | |
| 5 | ∞ (Aperture Stop) | 3.70 | | |
| 6 | 33.4959 | 0.86 | 1.647689 | 33.79 |
| 7 | 9.7960 | 5.50 | 1.804000 | 46.57 |
| 8 | −27.8872 | 0.47 | | |
| *9 | 29.2500 | 2.40 | 1.806100 | 40.73 |
| *10 | −130.8460 | 0.40 | | |
| 11 | ∞ | 0.80 | 1.922860 | 18.90 |
| 12 | 16.6589 | 2.51 | | |
| *13 | −7.2118 | 1.90 | 1.805004 | 40.98 |
| *14 | −12.0000 | 0.87 | | |
| 15 | 52.4207 | 5.80 | 1.834807 | 42.71 |
| 16 | −29.8692 | 6.71 | | |
| 17 | ∞ | 2.70 | 1.516330 | 64.14 |
| 18 | ∞ | | | |

*Aspherical Surface
f = 18.554 F No. = 2.06

TABLE 2

Example 1: Aspherical Surface Data

| | Aspherical Surface Coefficient: S9 | | Aspherical Surface Coefficient: S10 |
|---|---|---|---|
| KA | 4.78304655 | KA | −1497.83281901 |
| A3 | −2.53595966E−05 | A3 | 3.99685295E−04 |
| A4 | 5.91514146E−05 | A4 | −2.61954183E−04 |
| A5 | −4.93656786E−05 | A5 | 8.54474233E−06 |
| A6 | 4.75153450E−06 | A6 | 1.35531333E−05 |
| A7 | 7.34091959E−07 | A7 | −1.33495869E−06 |
| A8 | 2.19092014E−07 | A8 | −7.65249439E−08 |
| A9 | −1.01933177E−07 | A9 | −2.67058977E−08 |
| A10 | 4.87556962E−09 | A10 | 7.34713251E−09 |
| A11 | 6.30048753E−10 | A11 | 2.29305258E−10 |
| A12 | 9.55609385E−11 | A12 | −4.25150935E−11 |
| A13 | −5.32097670E−12 | A13 | −2.16472161E−12 |
| A14 | −6.34524093E−12 | A14 | −4.08200802E−12 |
| A15 | 7.81178659E−13 | A15 | 4.73756578E−13 |
| A16 | −1.86432156E−14 | A16 | 4.03970404E−15 |

| | Aspherical Surface Coefficient: S13 | | Aspherical Surface Coefficient: S14 |
|---|---|---|---|
| KA | −9.99999182 | KA | −9.03456826 |
| A3 | 1.44873607E−03 | A3 | 6.08341085E−04 |
| A4 | −4.57007497E−03 | A4 | −5.87639667E−04 |
| A5 | 1.22220936E−03 | A5 | 1.76418852E−04 |
| A6 | −8.81849829E−05 | A6 | −7.54073400E−06 |
| A7 | −3.13466545E−06 | A7 | −1.38246135E−06 |
| A8 | −8.63636316E−07 | A8 | 2.08740129E−07 |
| A9 | 3.14898636E−07 | A9 | 4.01946484E−08 |
| A10 | −1.63434945E−08 | A10 | −2.05178639E−08 |
| A11 | −8.44979403E−10 | A11 | 2.61661033E−09 |
| A12 | 2.11519332E−11 | A12 | −1.08213936E−10 |

Table 19 shows the values of Examples 1 through 9 corresponding to Conditional Formulae (1) through (7), that is, the equation portions of the conditional formulae. The values shown in Table 19 are related to the d line. As shown in Table 19, the imaging lens of Example 1 and the imaging lenses of Examples 2 through 9 to be described later satisfy all of Conditional Formulae (1) through (7), and further satisfy Conditional Formulae (1') through (7') as well as (1") that define more preferable ranges within Conditional Formulae (1) through (7). The advantageous effects obtained by satisfying these conditional formulae are those which were previously described in detail.

The spherical aberration, the astigmatic aberration, the distortion, and the lateral chromatic aberration of the imaging lens of Example 1 when focused on infinity are illustrated in A through D of FIG. 10, respectively. Each of the diagrams illustrate aberrations related to the d line (wavelength: 587.6 nm). However, aberrations related to wavelengths of 460.0 nm and 615.0 nm are also shown in the diagrams that illustrate spherical aberration. Particularly, aberrations related to wavelengths of 460.0 nm and 615.0 nm are shown in the diagrams that illustrate lateral chromatic aberration. In the diagrams that illustrate astigmatic aberrations, aberrations in the sagittal direction are indicated by solid lines, while aberrations in the tangential direction are indicated by broken lines. In the diagram that illustrates spherical aberration, "Fno." denotes F values. In the other diagrams that illustrate the aberrations, ω denotes half angles of view. The manners in which the aberrations are displayed described above also apply to FIG. 11 through FIG. 18, to be described later.

As illustrated in FIG. 10, the full angle of view (2ω) of the imaging lens of the present embodiment is 82.8°, which is a sufficiently wide angle of view. In addition, the imaging lenses of Examples 2 through 9 have full angles of view (2ω) within a range from 75.8° to 83.6° as illustrated in FIG. 11 through FIG. 18, and sufficiently wide angles of view are achieved.

Example 2

FIG. 2 illustrates the arrangement of lens groups in the imaging lens of Example 2. The imaging lens of Example 2 is of approximately the same configuration as the imaging lens of Example 1 described above. However, the imaging lens of Example 2 differs from the imaging lens of Example 1 in the two points that a second lens L2 is a positive meniscus lens having a convex surface toward the object side, and that a sixth lens L6 is a biconcave lens.

Note that the points of difference in configuration from the imaging lens of Example 1 are the same in Examples 3 through 6. Therefore, descriptions of the points of difference will not be repeated in the descriptions of Examples 3 through 6.

Table 3 shows basic lens data of the imaging lens of Example 2. Table 4 shows aspherical surface data of the imaging lens of Example 2. A through D of FIG. 11 are diagrams that illustrate various aberrations of the imaging lens of Example 2.

TABLE 3

Example 2: Basic Lens Data

| Si (Surface Number) | Ri (Radius of Curvature) | Di (Distance) | Ndj (Refractive Index) | vdj (Abbe's Number) |
|---|---|---|---|---|
| 1 | −130.0000 | 1.00 | 1.517417 | 52.43 |
| 2 | 9.3728 | 2.20 | | |
| 3 | 23.2239 | 2.20 | 1.834000 | 37.16 |
| 4 | 306.7400 | 1.92 | | |
| 5 | ∞ (Aperture Stop) | 3.70 | | |
| 6 | 24.7145 | 0.86 | 1.647689 | 33.79 |
| 7 | 9.2318 | 5.50 | 1.804000 | 46.57 |
| 8 | −25.6886 | 0.62 | | |
| *9 | 54.4173 | 2.21 | 1.803480 | 40.45 |
| *10 | −34.9352 | 0.66 | | |
| 11 | −153.3459 | 0.80 | 1.922860 | 18.90 |

TABLE 3-continued

Example 2: Basic Lens Data

| Si (Surface Number) | Ri (Radius of Curvature) | Di (Distance) | Ndj (Refractive Index) | vdj (Abbe's Number) |
|---|---|---|---|---|
| 12 | 16.8996 | 2.41 | | |
| *13 | −7.1953 | 1.70 | 1.803480 | 40.45 |
| *14 | −12.0000 | 0.71 | | |
| 15 | 53.3825 | 5.30 | 1.834807 | 42.71 |
| 16 | −30.1338 | 7.80 | | |
| 17 | ∞ | 2.70 | 1.516330 | 64.14 |
| 18 | ∞ | | | |

*Aspherical Surface
f = 18.851 F No. = 2.06

TABLE 4

Example 2: Aspherical Surface Data

| | Aspherical Surface Coefficient: S9 | | Aspherical Surface Coefficient: S10 |
|---|---|---|---|
| KA | 4.81681329 | KA | −25.25950749 |
| A3 | −1.48737551E−04 | A3 | 2.33313969E−04 |
| A4 | 1.02000705E−04 | A4 | −1.66288594E−04 |
| A5 | −6.57448035E−05 | A5 | −2.24914543E−05 |
| A6 | 6.62989549E−06 | A6 | 1.51067991E−05 |
| A7 | 8.45216364E−07 | A7 | −1.03947590E−06 |
| A8 | 2.31187153E−07 | A8 | −4.70534781E−08 |
| A9 | −1.15020037E−07 | A9 | −3.95362492E−08 |
| A10 | 5.28306013E−09 | A10 | 7.64321354E−09 |
| A11 | 7.47402723E−10 | A11 | 3.15488672E−10 |
| A12 | 1.47108610E−10 | A12 | 6.77132656E−12 |
| A13 | −1.56844032E−12 | A13 | −3.58237265E−13 |
| A14 | −7.22664593E−12 | A14 | −4.16878220E−12 |
| A15 | 3.08901966E−13 | A15 | −4.85468541E−14 |
| A16 | 3.54736872E−14 | A16 | 5.64388150E−14 |

| | Aspherical Surface Coefficient: S13 | | Aspherical Surface Coefficient: S14 |
|---|---|---|---|
| KA | −9.88951433 | KA | −9.86540022 |
| A3 | 1.98775601E−03 | A3 | 8.15495951E−04 |
| A4 | −4.77319314E−03 | A4 | −6.33798120E−04 |
| A5 | 1.27433157E−03 | A5 | 1.82880148E−04 |
| A6 | −9.09757952E−05 | A6 | −5.36953230E−06 |
| A7 | −3.92395232E−06 | A7 | −1.62089134E−06 |
| A8 | −8.61333009E−07 | A8 | 1.55075805E−07 |
| A9 | 3.19561813E−07 | A9 | 3.99720260E−08 |
| A10 | −1.43021744E−08 | A10 | −1.95845963E−08 |
| A11 | −8.87928373E−10 | A11 | 2.66170798E−09 |
| A12 | −5.77345282E−12 | A12 | −1.17194960E−10 |

Example 3

Figure 3:
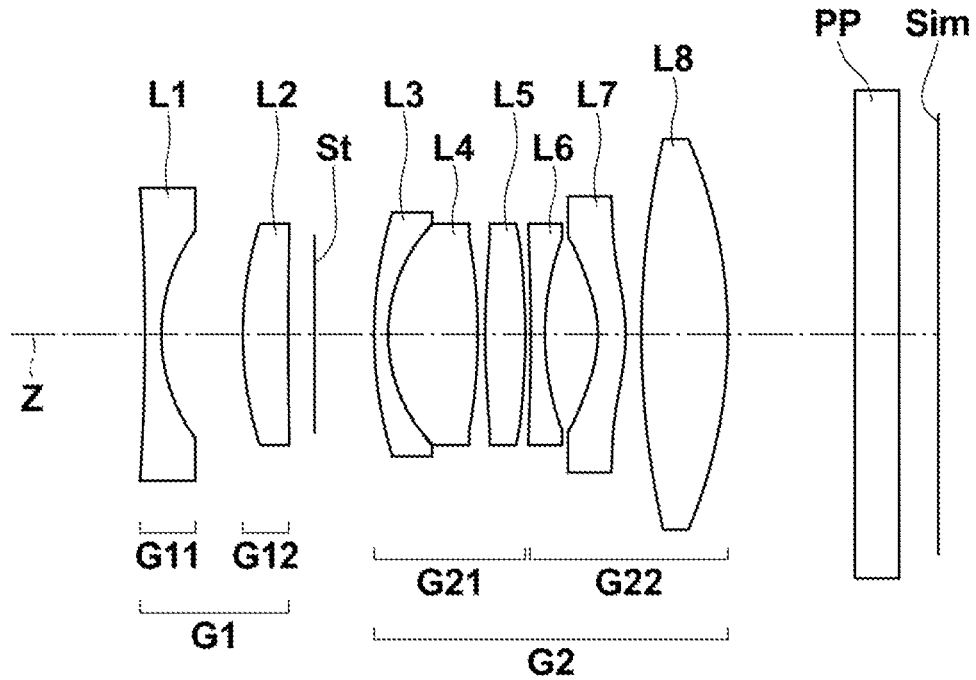
FIG. 3 is a sectional diagram that illustrates the lens configuration of an imaging lens according to Example 3 of the present invention.

FIG. 3 illustrates the arrangement of lens groups in the imaging lens of Example 3.

Table 5 shows basic lens data of the imaging lens of Example 3. Table 6 shows aspherical surface data of the imaging lens of Example 3. A through D of FIG. 12 are diagrams that illustrate various aberrations of the imaging lens of Example 3.

TABLE 5

Example 3: Basic Lens Data

| Si (Surface Number) | Ri (Radius of Curvature) | Di (Distance) | Ndj (Refractive Index) | vdj (Abbe's Number) |
|---|---|---|---|---|
| 1 | −130.0000 | 1.00 | 1.517417 | 52.43 |
| 2 | 10.8674 | 5.00 | | |

TABLE 5-continued

Example 3: Basic Lens Data

| Si (Surface Number) | Ri (Radius of Curvature) | Di (Distance) | Ndj (Refractive Index) | vdj (Abbe's Number) |
|---|---|---|---|---|
| 3 | 22.7371 | 2.80 | 1.834000 | 37.16 |
| 4 | 452.3189 | 1.60 | | |
| 5 | ∞ (Aperture Stop) | 3.66 | | |
| 6 | 25.8065 | 0.86 | 1.647689 | 33.79 |
| 7 | 9.8729 | 5.50 | 1.804000 | 46.57 |
| 8 | −33.2513 | 0.46 | | |
| *9 | 50.1808 | 2.45 | 1.803480 | 40.45 |
| *10 | −44.1144 | 0.33 | | |
| 11 | −148.4884 | 0.88 | 1.922860 | 18.90 |
| 12 | 17.1721 | 2.42 | | |
| *13 | −7.3040 | 1.70 | 1.803480 | 40.45 |
| *14 | −12.0000 | 0.98 | | |
| 15 | 54.5458 | 5.30 | 1.834807 | 42.71 |
| 16 | −30.9086 | 7.80 | | |
| 17 | ∞ | 2.70 | 1.516330 | 64.14 |
| 18 | ∞ | | | |

*Aspherical Surface
f = 18.856 F No. = 2.07

TABLE 6

Example 3: Aspherical Surface Data

| | Aspherical Surface Coefficient: S9 | | Aspherical Surface Coefficient: S10 |
|---|---|---|---|
| KA | 4.90090515 | KA | −25.22281915 |
| A3 | −1.84709305E−04 | A3 | 2.99627545E−04 |
| A4 | 1.05821251E−04 | A4 | −1.31941782E−04 |
| A5 | −6.65469018E−05 | A5 | −2.09834253E−05 |
| A6 | 6.61172613E−06 | A6 | 1.46865320E−05 |
| A7 | 8.36108156E−07 | A7 | −1.14208296E−06 |
| A8 | 2.25209237E−07 | A8 | −6.09820829E−08 |
| A9 | −1.16356900E−07 | A9 | −4.06604740E−08 |
| A10 | 5.06290063E−09 | A10 | 7.50824758E−09 |
| A11 | 7.31359358E−10 | A11 | 2.94183901E−10 |
| A12 | 1.48166446E−10 | A12 | 1.67466824E−12 |
| A13 | −9.70862393E−13 | A13 | −1.16466908E−12 |
| A14 | −7.23507634E−12 | A14 | −4.11154058E−12 |
| A15 | 2.89320207E−13 | A15 | −1.49318959E−14 |
| A16 | 4.00127676E−14 | A16 | 5.77182293E−14 |

| | Aspherical Surface Coefficient: S13 | | Aspherical Surface Coefficient: S14 |
|---|---|---|---|
| KA | −9.88382213 | KA | −9.88458283 |
| A3 | 2.56858244E−03 | A3 | 1.00726329E−03 |
| A4 | −4.72632229E−03 | A4 | −6.23110432E−04 |
| A5 | 1.27113397E−03 | A5 | 1.83108224E−04 |
| A6 | −9.17998235E−05 | A6 | −5.65132488E−06 |
| A7 | −3.99843732E−06 | A7 | −1.66903373E−06 |
| A8 | −8.59190196E−07 | A8 | 1.50757121E−07 |
| A9 | 3.20600103E−07 | A9 | 3.98900514E−08 |
| A10 | −1.42365085E−08 | A10 | −1.95881277E−08 |
| A11 | −9.13420969E−10 | A11 | 2.66925840E−09 |
| A12 | −1.58382351E−11 | A12 | −1.16589812E−10 |

Example 4

Figure 4:
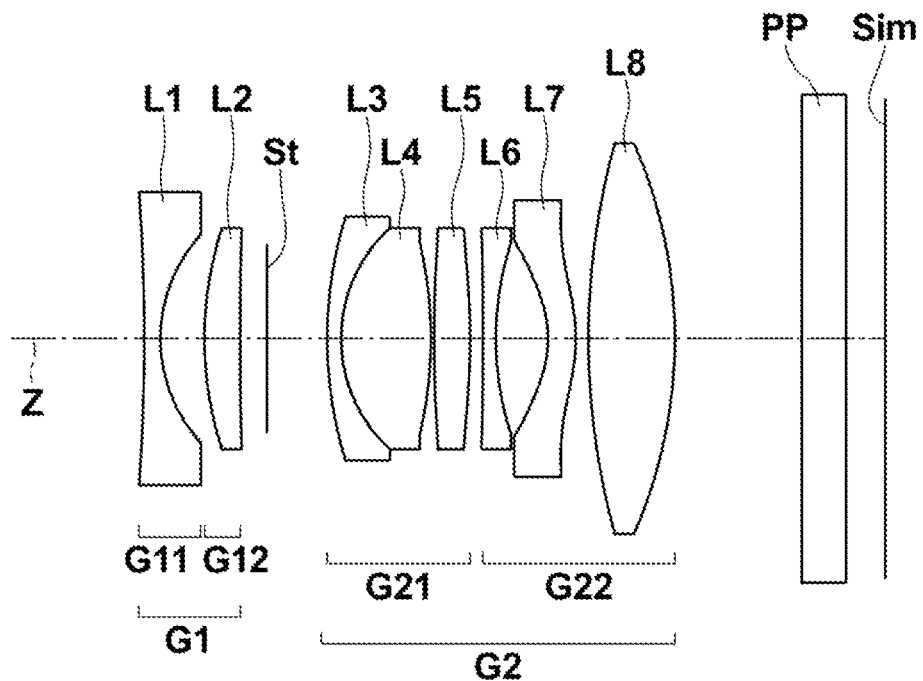
FIG. 4 is a sectional diagram that illustrates the lens configuration of an imaging lens according to Example 4 of the present invention.

FIG. 4 illustrates the arrangement of lens groups in the imaging lens of Example 4.

Table 7 shows basic lens data of the imaging lens of Example 4. Table 8 shows aspherical surface data of the imaging lens of Example 4. A through D of FIG. 13 are diagrams that illustrate various aberrations of the imaging lens of Example 4.

TABLE 7

Example 4: Basic Lens Data

| Si (Surface Number) | Ri (Radius of Curvature) | Di (Distance) | Ndj (Refractive Index) | vdj (Abbe's Number) |
|---|---|---|---|---|
| 1 | −130.0000 | 1.00 | 1.517417 | 52.43 |
| 2 | 9.5102 | 2.70 | | |
| 3 | 22.0961 | 2.20 | 1.834000 | 37.16 |
| 4 | 334.6333 | 1.63 | | |
| 5 | ∞ (Aperture Stop) | 3.70 | | |
| 6 | 25.4951 | 0.86 | 1.647689 | 33.79 |
| 7 | 9.2423 | 5.50 | 1.804000 | 46.57 |
| 8 | −25.9075 | 0.20 | | |
| *9 | 85.0392 | 2.21 | 1.803480 | 40.45 |
| *10 | −44.4582 | 0.79 | | |
| 11 | −285.3358 | 0.80 | 1.922860 | 18.90 |
| 12 | 19.2135 | 2.42 | | |
| *13 | −6.7318 | 1.70 | 1.730770 | 40.51 |
| *14 | −10.8069 | 0.78 | | |
| 15 | 45.3313 | 5.30 | 1.729157 | 54.68 |
| 16 | −30.0121 | 7.80 | | |
| 17 | ∞ | 2.70 | 1.516330 | 64.14 |
| 18 | ∞ | | | |

*Aspherical Surface
f = 18.854 F No. = 2.09

TABLE 8

Example 4: Aspherical Surface Data

| Aspherical Surface Coefficient: S9 | | Aspherical Surface Coefficient: S10 | |
|---|---|---|---|
| KA | 4.90233180 | KA | −25.32361273 |
| A3 | −2.43344984E−06 | A3 | 2.09092766E−04 |
| A4 | 8.69079933E−05 | A4 | −1.07368132E−04 |
| A5 | −6.21234152E−05 | A5 | −2.46541399E−05 |
| A6 | 7.05846160E−06 | A6 | 1.46279612E−05 |
| A7 | 8.68495255E−07 | A7 | −1.05765476E−06 |
| A8 | 2.29094008E−07 | A8 | −3.90280046E−08 |
| A9 | −1.16099630E−07 | A9 | −3.75449670E−08 |
| A10 | 5.18271233E−09 | A10 | 7.84158519E−09 |
| A11 | 7.47364287E−10 | A11 | 2.98286523E−10 |
| A12 | 1.50595263E−10 | A12 | −4.35192600E−12 |
| A13 | −8.89086279E−13 | A13 | −2.71933023E−12 |
| A14 | −7.22591573E−12 | A14 | −4.37892027E−12 |
| A15 | 2.64791258E−13 | A15 | 1.59611740E−13 |
| A16 | 4.05305351E−14 | A16 | 3.97854984E−14 |

| Aspherical Surface Coefficient: S13 | | Aspherical Surface Coefficient: S14 | |
|---|---|---|---|
| KA | −9.42717713 | KA | −9.75085149 |
| A3 | 6.66894845E−04 | A3 | 3.08905101E−04 |
| A4 | −4.60543525E−03 | A4 | −6.23476051E−04 |
| A5 | 1.28372358E−03 | A5 | 1.92574624E−04 |
| A6 | −9.22261267E−05 | A6 | −4.70968505E−06 |
| A7 | −4.13985321E−06 | A7 | −1.64676037E−06 |
| A8 | −8.69474031E−07 | A8 | 1.45219713E−07 |
| A9 | 3.22905935E−07 | A9 | 3.92474750E−08 |
| A10 | −1.36578007E−08 | A10 | −1.96051724E−08 |
| A11 | −8.48649111E−10 | A11 | 2.67123982E−09 |
| A12 | −3.14053694E−11 | A12 | −1.16998732E−10 |

TABLE 9

Example 5: Basic Lens Data

| Si (Surface Number) | Ri (Radius of Curvature) | Di (Distance) | Ndj (Refractive Index) | vdj (Abbe's Number) |
|---|---|---|---|---|
| 1 | −130.0000 | 1.00 | 1.517417 | 52.43 |
| 2 | 8.9033 | 2.20 | | |
| 3 | 20.1515 | 2.20 | 1.834000 | 37.16 |
| 4 | 296.1613 | 1.50 | | |
| 5 | ∞ (Aperture Stop) | 3.00 | | |
| 6 | 24.7340 | 0.86 | 1.647689 | 33.79 |
| 7 | 9.0025 | 5.00 | 1.804000 | 46.57 |
| 8 | −24.1575 | 0.36 | | |
| *9 | 57.6598 | 2.21 | 1.803480 | 40.45 |
| *10 | −33.1452 | 0.43 | | |
| 11 | −147.1837 | 0.80 | 1.922860 | 18.90 |
| 12 | 15.9115 | 2.40 | | |
| *13 | −7.2122 | 1.70 | 1.803480 | 40.45 |
| *14 | −12.0000 | 0.86 | | |
| 15 | 52.1174 | 5.30 | 1.834807 | 42.71 |
| 16 | −30.0118 | 7.80 | | |
| 17 | ∞ | 2.70 | 1.516330 | 64.14 |
| 18 | ∞ | | | |

*Aspherical Surface
f = 18.844 F No. = 2.06

TABLE 10

Example 5: Aspherical Surface Data

| Aspherical Surface Coefficient: S9 | | Aspherical Surface Coefficient: S10 | |
|---|---|---|---|
| KA | 4.81697393 | KA | −25.25812231 |
| A3 | −2.87083732E−04 | A3 | 1.18906335E−04 |
| A4 | 1.05711740E−04 | A4 | −1.88109111E−04 |
| A5 | −6.53027730E−05 | A5 | −2.34215137E−05 |
| A6 | 6.68165534E−06 | A6 | 1.52087805E−05 |
| A7 | 8.53227276E−07 | A7 | −1.00378688E−06 |
| A8 | 2.32786056E−07 | A8 | −4.03960798E−08 |
| A9 | −1.14759171E−07 | A9 | −3.86232149E−08 |
| A10 | 5.33961887E−09 | A10 | 7.75211108E−09 |
| A11 | 7.55941020E−10 | A11 | 3.22968768E−10 |
| A12 | 1.48424669E−10 | A12 | 6.57664659E−12 |
| A13 | −1.42751835E−12 | A13 | −5.75922797E−13 |
| A14 | −7.22317200E−12 | A14 | −4.21518210E−12 |
| A15 | 3.05071684E−13 | A15 | −5.22006545E−14 |
| A16 | 3.44249052E−14 | A16 | 5.69869593E−14 |

| Aspherical Surface Coefficient: S13 | | Aspherical Surface Coefficient: S14 | |
|---|---|---|---|
| KA | −9.89517991 | KA | −9.85793120 |
| A3 | 1.85057692E−03 | A3 | 5.21756700E−04 |
| A4 | −4.82506210E−03 | A4 | −6.33880498E−04 |
| A5 | 1.27004228E−03 | A5 | 1.83688280E−04 |
| A6 | −9.11546904E−05 | A6 | −5.27618751E−06 |
| A7 | −3.89232232E−06 | A7 | −1.61504338E−06 |
| A8 | −8.50728357E−07 | A8 | 1.55286768E−07 |
| A9 | 3.21279636E−07 | A9 | 4.00169628E−08 |
| A10 | −1.41686834E−08 | A10 | −1.95650895E−08 |
| A11 | −9.17275261E−10 | A11 | 2.66391220E−09 |
| A12 | −2.40950739E−11 | A12 | −1.17572834E−10 |

Example 5

Figure 5:
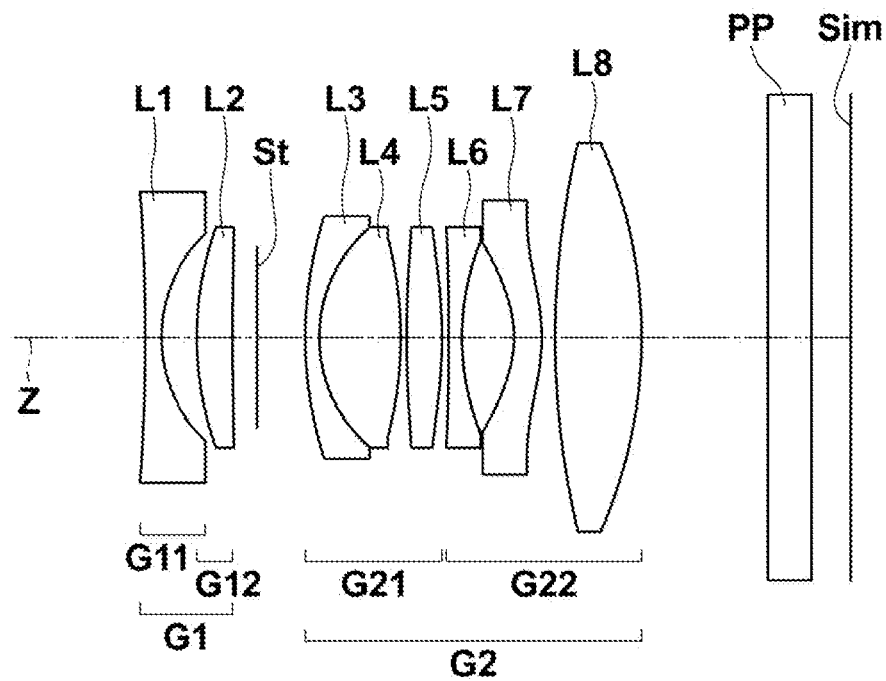
FIG. 5 is a sectional diagram that illustrates the lens configuration of an imaging lens according to Example 5 of the present invention.

FIG. 5 illustrates the arrangement of lens groups in the imaging lens of Example 5.

Table 9 shows basic lens data of the imaging lens of Example 5. Table 10 shows aspherical surface data of the imaging lens of Example 5. A through D of FIG. 14 are diagrams that illustrate various aberrations of the imaging lens of Example 5.

Example 6

Figure 6:
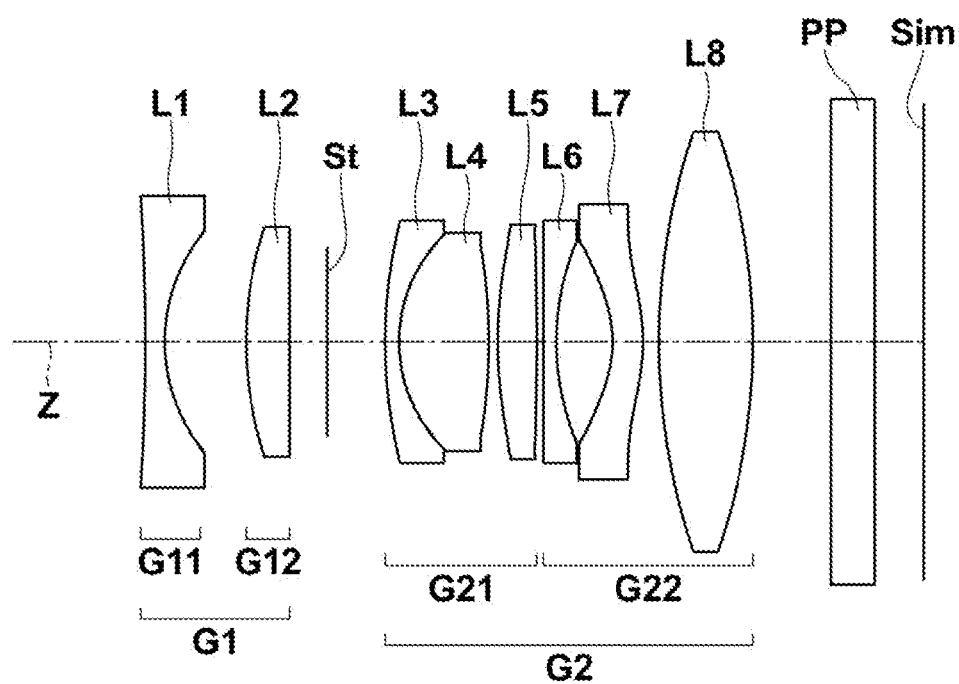
FIG. 6 is a sectional diagram that illustrates the lens configuration of an imaging lens according to Example 6 of the present invention.

FIG. 6 illustrates the arrangement of lens groups in the imaging lens of Example 6. The basic shapes of a first lens L1 through an eighth lens L8 of the present example are the same as those of the imaging lens of Example 1 described previously.

Table 11 shows basic lens data of the imaging lens of Example 6. Table 12 shows aspherical surface data of the imaging lens of Example 6. A through D of FIG. 15 are diagrams that illustrate various aberrations of the imaging lens of Example 6.

TABLE 11

Example 6: Basic Lens Data

| Si (Surface Number) | Ri (Radius of Curvature) | Di (Distance) | Ndj (Refractive Index) | νdj (Abbe's Number) |
|---|---|---|---|---|
| 1 | −145.0864 | 1.20 | 1.517417 | 52.43 |
| 2 | 10.8800 | 5.00 | | |
| 3 | 22.3837 | 2.70 | 1.834000 | 37.16 |
| 4 | ∞ | 3.04 | | |
| 5 | ∞ (Aperture Stop) | 3.60 | | |
| 6 | 31.0470 | 0.86 | 1.647689 | 33.79 |
| 7 | 9.3039 | 5.50 | 1.804000 | 46.57 |
| 8 | −35.6789 | 0.59 | | |
| *9 | 28.2650 | 2.40 | 1.803480 | 40.45 |
| *10 | −114.4925 | 0.40 | | |
| 11 | ∞ | 0.80 | 1.922860 | 18.90 |
| 12 | 16.2687 | 3.04 | | |
| *13 | −7.3314 | 1.90 | 1.803480 | 40.45 |
| *14 | −12.0000 | 0.98 | | |
| 15 | 40.8171 | 5.80 | 1.834807 | 42.71 |
| 16 | −39.7764 | 4.80 | | |
| 17 | ∞ | 2.70 | 1.516330 | 64.14 |
| 18 | ∞ | | | |

*Aspherical Surface
f = 18.176 F No. = 2.06

TABLE 12

Example 6: Aspherical Surface Data

| | Aspherical Surface Coefficient: S9 | | Aspherical Surface Coefficient: S10 |
|---|---|---|---|
| KA | 4.77007960 | KA | −1497.54565857 |
| A3 | −3.79293326E−05 | A3 | 4.04467015E−04 |
| A4 | 5.70357143E−05 | A4 | −2.59391917E−04 |
| A5 | −4.98225602E−05 | A5 | 8.97086394E−06 |
| A6 | 4.67436260E−06 | A6 | 1.35791720E−05 |
| A7 | 7.24833738E−07 | A7 | −1.33900297E−06 |
| A8 | 2.18220211E−07 | A8 | −7.82873179E−08 |
| A9 | −1.01974508E−07 | A9 | −2.70538943E−08 |
| A10 | 4.86981213E−09 | A10 | 7.29189058E−09 |
| A11 | 6.28923650E−10 | A11 | 2.23853917E−10 |
| A12 | 9.52146829E−11 | A12 | −4.27010780E−11 |
| A13 | −5.37120455E−12 | A13 | −2.06882541E−12 |
| A14 | −6.34684918E−12 | A14 | −4.05427667E−12 |
| A15 | 7.81955863E−13 | A15 | 4.80449294E−13 |
| A16 | −1.78849114E−14 | A16 | 4.02247345E−15 |

| | Aspherical Surface Coefficient: S13 | | Aspherical Surface Coefficient: S14 |
|---|---|---|---|
| KA | −10.00000005 | KA | −8.85644971 |
| A3 | 1.87794510E−03 | A3 | 5.53775377E−04 |
| A4 | −4.70929110E−03 | A4 | −5.88883792E−04 |
| A5 | 1.25990398E−03 | A5 | 1.77823269E−04 |
| A6 | −8.97858655E−05 | A6 | −6.42441811E−06 |
| A7 | −3.58496731E−06 | A7 | −1.43469031E−06 |
| A8 | −8.76017548E−07 | A8 | 1.87860292E−07 |
| A9 | 3.16843370E−07 | A9 | 3.89529996E−08 |
| A10 | −1.53220422E−08 | A10 | −2.02431200E−08 |
| A11 | −7.89621795E−10 | A11 | 2.65239445E−09 |
| A12 | 1.75372381E−12 | A12 | −1.12065607E−10 |

Example 7

FIG. 7 illustrates the arrangement of lens groups in the imaging lens of Example 7. The imaging lens of Example 7 has approximately the same configuration as the imaging lens of Example 1 described previously. However, the imaging lens of Example 7 differs from the imaging lens of Example 1 in that a second lens L2 is a positive meniscus lens with a convex surface toward the object side.

Table 13 shows basic lens data of the imaging lens of Example 7. Table 14 shows aspherical surface data of the imaging lens of Example 7. A through D of FIG. 16 are diagrams that illustrate various aberrations of the imaging lens of Example 7.

TABLE 13

Example 7: Basic Lens Data

| Si (Surface Number) | Ri (Radius of Curvature) | Di (Distance) | Ndj (Refractive Index) | νdj (Abbe's Number) |
|---|---|---|---|---|
| 1 | 490.4644 | 1.00 | 1.517417 | 52.43 |
| 2 | 9.0938 | 2.40 | | |
| 3 | 16.3026 | 2.15 | 1.834000 | 37.16 |
| 4 | 43.0920 | 2.03 | | |
| 5 | ∞ (Aperture Stop) | 3.80 | | |
| 6 | 20.6269 | 0.86 | 1.647689 | 33.79 |
| 7 | 9.0025 | 5.50 | 1.804000 | 46.57 |
| 8 | −25.5385 | 0.27 | | |
| *9 | 38.0679 | 2.30 | 1.803480 | 40.45 |
| *10 | −114.9964 | 0.28 | | |
| 11 | ∞ | 1.00 | 1.922860 | 18.90 |
| 12 | 17.0800 | 7.36 | | |
| *13 | −5.9995 | 1.50 | 1.803480 | 40.45 |
| *14 | −9.3294 | 0.81 | | |
| 15 | 47.0517 | 5.20 | 1.834807 | 42.71 |
| 16 | −35.8574 | 1.00 | | |
| 17 | ∞ | 2.62 | 1.516798 | 64.20 |
| 18 | ∞ | | | |

*Aspherical Surface
f = 18.865 F No. = 2.06

TABLE 14

Example 7: Aspherical Surface Data

| | Aspherical Surface Coefficient: S9 | | Aspherical Surface Coefficient: S10 |
|---|---|---|---|
| KA | −8.86187060 | KA | 12.89110464 |
| A3 | −1.78072549E−05 | A3 | 5.56276759E−04 |
| A4 | −7.33015125E−05 | A4 | −3.56310692E−04 |
| A5 | 2.99704998E−05 | A5 | 8.54766745E−05 |
| A6 | −4.05937221E−06 | A6 | 1.07528439E−06 |
| A7 | −2.54883663E−07 | A7 | −1.58434600E−06 |
| A8 | −5.79695842E−08 | A8 | −1.89441910E−07 |
| A9 | 5.45482276E−08 | A9 | 7.98471867E−08 |
| A10 | −2.94274226E−09 | A10 | 2.05319386E−09 |
| A11 | −6.69741527E−11 | A11 | −5.70596167E−10 |
| A12 | −1.21522411E−10 | A12 | −1.24050605E−10 |
| A13 | −9.20311348E−12 | A13 | −1.26463034E−11 |
| A14 | 4.04140532E−12 | A14 | 4.78323072E−12 |
| A15 | −1.45530396E−13 | A15 | −6.83539013E−13 |
| A16 | −4.35836396E−15 | A16 | 5.96271008E−14 |

| | Aspherical Surface Coefficient: S13 | | Aspherical Surface Coefficient: S14 |
|---|---|---|---|
| KA | −4.35159775 | KA | −1.22136855 |
| A3 | 1.56110052E−03 | A3 | −3.84243737E−04 |
| A4 | −3.28032310E−03 | A4 | 9.66250561E−04 |
| A5 | 7.85868750E−04 | A5 | −1.50246747E−04 |
| A6 | −3.80578890E−05 | A6 | 2.44246524E−05 |
| A7 | −4.32824501E−06 | A7 | −2.17723598E−07 |
| A8 | −2.81611524E−07 | A8 | −1.81520972E−07 |
| A9 | 1.61215013E−07 | A9 | −8.53898812E−09 |
| A10 | −5.63933411E−09 | A10 | −4.71404340E−09 |
| A11 | −1.83433966E−09 | A11 | 1.26477822E−09 |
| A12 | 1.33497232E−10 | A12 | −6.59889353E−11 |

Example 8

FIG. 8 illustrates the arrangement of lens groups in the imaging lens group of Example 8. The imaging lens of Example 8 has approximately the same configuration as the imaging lens of Example 1 described previously, but differs from the imaging lens of Example 1 in the point that a second lens L2 is a positive meniscus lens having a convex surface toward the object side.

Table 15 shows basic lens data of the imaging lens of Example 8. Table 16 shows aspherical surface data of the imaging lens of Example 8. A through D of FIG. 17 are diagrams that illustrate various aberrations of the imaging lens of Example 8.

TABLE 15

Example 8: Basic Lens Data

| Si (Surface Number) | Ri (Radius of Curvature) | Di (Distance) | Ndj (Refractive Index) | vdj (Abbe's Number) |
|---|---|---|---|---|
| 1 | −143.4302 | 1.20 | 1.517417 | 52.43 |
| 2 | 11.6703 | 5.50 | | |
| 3 | 20.6147 | 2.70 | 1.834000 | 37.16 |
| 4 | 2742.1811 | 3.38 | | |
| 5 | ∞ (Aperture Stop) | 3.60 | | |
| 6 | 41.5164 | 0.86 | 1.647689 | 33.79 |
| 7 | 9.0026 | 5.50 | 1.804000 | 46.57 |
| 8 | −42.0839 | 0.59 | | |
| *9 | 29.8087 | 2.40 | 1.803480 | 40.45 |
| *10 | −141.6629 | 0.40 | | |
| 11 | ∞ | 0.80 | 1.922860 | 18.90 |
| 12 | 16.5450 | 3.38 | | |
| *13 | −7.2645 | 1.90 | 1.803480 | 40.45 |
| *14 | −12.0000 | 0.20 | | |
| 15 | 49.7420 | 6.50 | 1.882997 | 40.76 |
| 16 | −30.3632 | 6.00 | | |
| 17 | ∞ | 2.70 | 1.516330 | 64.14 |
| 18 | ∞ | | | |

*Aspherical Surface
f = 19.155 F No. = 2.06

TABLE 16

Example 8: Aspherical Surface Data

| Aspherical Surface Coefficient: S9 | | Aspherical Surface Coefficient: S10 | |
|---|---|---|---|
| KA | 4.76267672 | KA | −1153.48297732 |
| A3 | −5.70636004E−05 | A3 | 5.16014392E−04 |
| A4 | 6.31322991E−05 | A4 | −2.57379280E−04 |
| A5 | −4.99384464E−05 | A5 | 9.63037754E−06 |
| A6 | 4.53276044E−06 | A6 | 1.36365163E−05 |
| A7 | 7.02709930E−07 | A7 | −1.35152204E−06 |
| A8 | 2.16335454E−07 | A8 | −8.36407696E−08 |
| A9 | −1.01973299E−07 | A9 | −2.80335662E−08 |
| A10 | 4.87947458E−09 | A10 | 7.15547788E−09 |
| A11 | 6.28864718E−10 | A11 | 2.17661316E−10 |
| A12 | 9.44440825E−11 | A12 | −4.11255102E−11 |
| A13 | −5.56368924E−12 | A13 | −1.44091129E−12 |
| A14 | −6.36575533E−12 | A14 | −3.93136758E−12 |
| A15 | 7.84831353E−13 | A15 | 4.93771098E−13 |
| A16 | −1.66476918E−14 | A16 | 1.50458813E−16 |

| Aspherical Surface Coefficient: S13 | | Aspherical Surface Coefficient: S14 | |
|---|---|---|---|
| KA | −10.00000000 | KA | −9.31945544 |
| A3 | 1.44374813E−03 | A3 | 3.39093757E−04 |
| A4 | −4.70276848E−03 | A4 | −6.13227765E−04 |
| A5 | 1.26192021E−03 | A5 | 1.76064166E−04 |
| A6 | −8.95877705E−05 | A6 | −6.45501592E−06 |
| A7 | −3.58500972E−06 | A7 | −1.42219886E−06 |

TABLE 16-continued

Example 8: Aspherical Surface Data

| A8 | −8.79993883E−07 | A8 | 1.90066843E−07 |
|---|---|---|---|
| A9 | 3.16112436E−07 | A9 | 3.91610080E−08 |
| A10 | −1.53761147E−08 | A10 | −2.02381642E−08 |
| A11 | −7.72752505E−10 | A11 | 2.65132961E−09 |
| A12 | 1.05279542E−11 | A12 | −1.12120754E−10 |

Example 9

Figure 9:
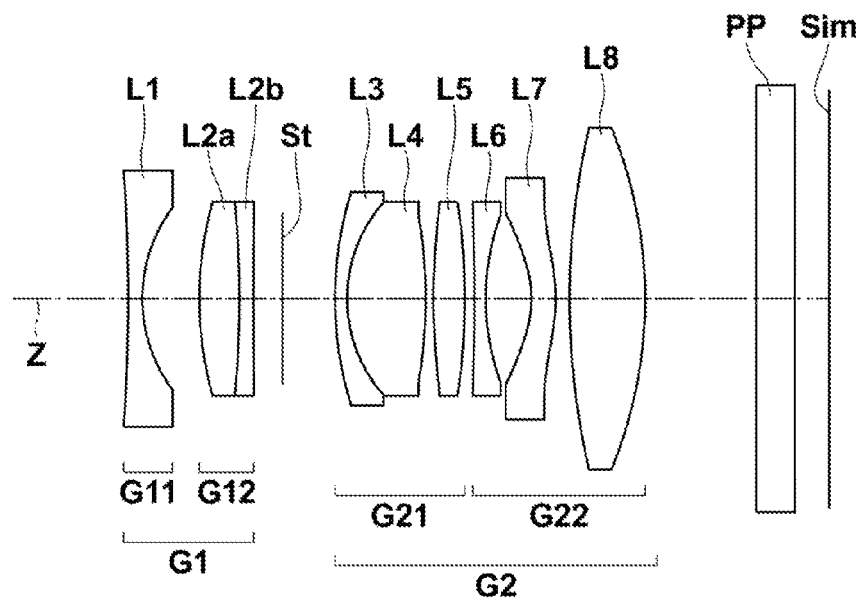
FIG. 9 is a sectional diagram that illustrates the lens configuration of an imaging lens according to Example 9 of the present invention.

FIG. 9 illustrates the arrangement of lens groups in the imaging lens of Example 9. The imaging lens of Example 9 is of approximately the same configuration as the imaging lens of Example 1 described previously. However, the imaging lens of Example 9 differs from the imaging lens of Example 1 in the two points that a cemented lens formed by cementing a biconvex lens 2a and a biconcave lens 2b together is employed instead of the second lens L2, and that a sixth lens L6 is a biconcave lens. Note that in this case, the cemented lens is the positive lens component within the 12 lens group G12.

Table 17 shows basic lens data of the imaging lens of Example 9. Table 18 shows aspherical surface data of the imaging lens of Example 9. A through D of FIG. 18 are diagrams that illustrate various aberrations of the imaging lens of Example 9.

TABLE 17

Example 9: Basic Lens Data

| Si (Surface Number) | Ri (Radius of Curvature) | Di (Distance) | Ndj (Refractive Index) | vdj (Abbe's Number) |
|---|---|---|---|---|
| 1 | −130.0000 | 1.00 | 1.517417 | 52.43 |
| 2 | 10.7440 | 4.00 | | |
| 3 | 25.5704 | 2.80 | 1.834000 | 37.16 |
| 4 | −76.0000 | 1.00 | 1.717362 | 29.52 |
| 5 | 452.3189 | 2.02 | | |
| 6 | ∞ (Aperture Stop) | 3.70 | | |
| 7 | 25.3994 | 0.86 | 1.647689 | 33.79 |
| 8 | 10.2922 | 5.50 | 1.804000 | 46.57 |
| 9 | −34.7287 | 0.54 | | |
| *10 | 42.8608 | 2.21 | 1.803480 | 40.45 |
| *11 | −43.1359 | 0.67 | | |
| 12 | −215.7889 | 0.80 | 1.922860 | 18.90 |
| 13 | 17.1622 | 2.41 | | |
| *14 | −7.3112 | 1.70 | 1.803480 | 40.45 |
| *15 | −12.0000 | 0.98 | | |
| 16 | 53.7085 | 5.30 | 1.834807 | 42.71 |
| 17 | −31.6295 | 7.80 | | |
| 18 | ∞ | 2.70 | 1.516330 | 64.14 |
| 19 | ∞ | | | |

*Aspherical Surface
f = 18.856 F No. = 2.07

TABLE 18

Example 9: Aspherical Surface Data

| Aspherical Surface Coefficient: S10 | | Aspherical Surface Coefficient: S11 | |
|---|---|---|---|
| KA | 4.53804858 | KA | −26.33457998 |
| A3 | −2.77625404E−04 | A3 | 1.03461084E−04 |
| A4 | 1.42779695E−04 | A4 | −8.02890388E−05 |
| A5 | −6.36198392E−05 | A5 | −2.25161828E−05 |
| A6 | 6.35531239E−06 | A6 | 1.42351475E−05 |
| A7 | 7.74273055E−07 | A7 | −1.16698223E−06 |
| A8 | 2.20540871E−07 | A8 | −5.82713249E−08 |

TABLE 18-continued

Example 9: Aspherical Surface Data

| A9 | −1.15830601E−07 | A9 | −3.96742791E−08 |
| A10 | 5.26577747E−10 | A10 | 7.65099489E−09 |
| A11 | 7.65678287E−10 | A11 | 3.12343667E−10 |
| A12 | 1.52079022E−10 | A12 | 3.98505606E−12 |
| A13 | −8.01265939E−13 | A13 | −7.56019115E−13 |
| A14 | −7.26345367E−12 | A14 | −4.00722782E−12 |
| A15 | 2.77845354E−13 | A15 | −5.44602626E−15 |
| A16 | 3.76915988E−14 | A16 | 5.01244423E−14 |

| Aspherical Surface Coefficient: S14 | | Aspherical Surface Coefficient: S15 | |
| --- | --- | --- | --- |
| KA | −10.00000000 | KA | −9.72845693 |
| A3 | 2.35823491E−03 | A3 | 1.01512239E−03 |
| A4 | −4.67754570E−03 | A4 | −6.23521054E−04 |
| A5 | 1.26710826E−03 | A5 | 1.84900802E−04 |
| A6 | −9.21885725E−05 | A6 | −5.74120048E−06 |
| A7 | −3.95201068E−06 | A7 | −1.69612533E−06 |
| A8 | −8.49721041E−07 | A8 | 1.50706043E−07 |
| A9 | 3.21149137E−07 | A9 | 4.05155244E−08 |
| A10 | −1.44050937E−08 | A10 | −1.94776230E−08 |
| A11 | −9.30744700E−10 | A11 | 2.67438472E−09 |
| A12 | −2.91569104E−12 | A12 | −1.19110054E−10 |

Values Related to Conditional Formulae

| | Example 1 | Example 2 | Example 3 | Example 4 | Example 5 | Example 6 | Example 7 | Example 8 | Example 9 |
| --- | --- | --- | --- | --- | --- | --- | --- | --- | --- |
| (1) f/f1 | −0.166 | −0.411 | −0.145 | −0.332 | −0.345 | −0.077 | −0.372 | 0.057 | −0.241 |
| (2) d12/f | 0.202 | 0.117 | 0.265 | 0.143 | 0.117 | 0.275 | 0.127 | 0.287 | 0.212 |
| (3) TL/Y | 3.174 | 3.042 | 3.538 | 3.042 | 2.840 | 3.214 | 2.946 | 3.348 | 3.295 |
| (4) Nd22 | 1.854 | 1.854 | 1.854 | 1.794 | 1.854 | 1.854 | 1.854 | 1.870 | 1.854 |
| (5) TL/Σd | 1.309 | 1.368 | 1.335 | 1.369 | 1.392 | 1.259 | 1.304 | 1.294 | 1.330 |
| (6) |f1n|/f | 0.993 | 0.890 | 1.021 | 0.902 | 0.849 | 1.069 | 0.946 | 1.082 | 1.010 |
| (7) (R21 + R12)/(R21 − R12) | 2.736 | 2.343 | 2.831 | 2.551 | 2.583 | 2.892 | 3.523 | 3.610 | 2.454 |

Note that FIG. 1 illustrates an example in which the optical member PP is provided between the lens system and the imaging surface Sim. Alternatively, various filters such as low pass filters and filters that cut off specific wavelength bands may be provided among each of the lenses. As a further alternative, coatings that have the same functions as the various filters may be administered on the surfaces of the lenses.

Next, an imaging apparatus according to the present invention will be described. FIG. 19 is a perspective view of a camera according to an embodiment of the present invention. The camera 10 of FIG. 19 is a compact digital camera provided with an imaging lens 12, which is a compact wide angle lens according to an embodiment of the present invention, at the front and interior of a camera body 11. A flash emitting device 13 for emitting flash onto subjects is provided on the front surface of the camera body 11. A shutter release button 15 and a power button 16 are provided on the upper surface of the camera body 11. An imaging device 17 is provided within the camera body 11. The imaging device 17 images optical images, which are formed by the compact wide angle lens 12, and converts the optical images to electrical signals. The imaging device is constituted by a CCD, a CMOS, or the like.

As described previously, the imaging lens 12 according to the embodiment of the present invention realizes sufficient miniaturization. Therefore, the camera 10 can be compact both while being carried and during photography, without adopting a retractable lens configuration. Alternatively, in the case that a retractable lens configuration is adopted, the camera 10 can be more compact and more portable than conventional cameras with retractable lenses. In addition, the camera 10 is capable of performing photography with high image quality and a wide angle of view, because the imaging lens 12 of the present invention is employed.

Next, an imaging apparatus according to another embodiment of the present invention will be described with reference to FIG. 20A and FIG. 20B. A camera 30 illustrated in the perspective views of FIG. 20A and FIG. 20B is a mirrorless single lens reflex digital still camera, onto which an exchangeable lens 20 is interchangeably mounted. FIG. 20A illustrates the outer appearance of the camera 30 as viewed from the front, and FIG. 20B illustrates the outer appearance of the camera 30 as viewed from the rear.

The camera 30 is equipped with a camera body 31. A shutter release button 32 and a power button 33 is provided on the upper surface of the camera body 31. Operating sections 34 and 35 and a display section 36 are provided on the rear surface of the camera body 31. The display section 36 displays images which have been photographed and images within the angle of view prior to photography.

A photography opening, in to which light from targets of photography enters, is provided at the central portion of the front surface of the camera body 31. A mount 37 is provided at a position corresponding to the photography opening. The exchangeable lens 20 is mounted onto the camera body 31 via the mount 37. The exchangeable lens 20 is an imaging lens according to the present invention housed within a lens barrel.

An imaging device (not shown), such as a CCD that receives images of subjects formed by the exchangeable lens 20 and outputs image signals corresponding to the images, a signal processing circuit that processes the image signals output by the imaging device to generate images, and a recording medium for recording the generated images, are provided within the camera body 31. In this camera 30, photography of a still image corresponding to a single frame is performed by pressing the shutter release button 32. Image data obtained by photography are recorded in the recording medium.

The mirrorless single lens reflex camera 30 is sufficiently compact in a state in which the exchangeable lens 20 is mounted thereon, and capable of photography with high image quality and a wide angle of view, because the imaging lens according to the present invention is employed as the exchangeable lens 20.

The present invention has been described with reference to the embodiments and Examples thereof. However, the present invention is not limited to the embodiments and Examples described above, and various modifications are possible. For example, the values of the radii of curvature of each lens component, the distances among surfaces, the refractive indices, the Abbe's numbers, the aspherical surface coefficients, etc., are not limited to the numerical values indicated in connection with the Examples, and may be other values.

What is claimed is:

1. An imaging lens, substantially consisting of:
a first lens group having a negative or a positive refractive power;
an aperture stop; and
a second lens group having a positive refractive power, provided in this order from an object side;
the first lens group being constituted by an 11 lens group having a negative refractive power and a 12 lens group having a positive refractive power, which are constituted by 3 or fewer lenses as a whole, provided in this order from the object side;
the 11 lens group being constituted by a single first lens, and the 12 lens group being constituted by a single lens provided at a spatial interval from the first lens or by a cemented lens, which is a positive lens component, provided at a spatial interval from the first lens;
the second lens group substantially consisting of a 21 lens group having a positive refractive power and a 22 lens group having a negative refractive power, provided in which order from the object side;
the 21 lens group having at least one positive lens and at least one negative lens;
the 22 lens group substantially consisting of a total of three lenses including at least one positive lens and at least one negative lens; and
the imaging lens satisfying Conditional Formulae (1), (2), and (3) below:

$$-0.50 < f/f1 < 0.20 \quad (1)$$

$$0.08 < d12/f < 0.35 \quad (2)$$

$$2.5 < TL/Y < 4.0 \quad (3)$$

wherein f is the focal length of the entire lens system, f1 is the focal length of the first lens group, d12 is a distance along an optical axis from the lens surface toward an image side of the first lens within the first lens group to the lens surface most toward the object side of the positive lens component, TL is the distance along the optical axis from the lens surface most toward the object side within the first lens group to the imaging surface, and Y is a maximum image height, when focused on an object at infinity.

2. An imaging lens as defined in claim 1 that satisfies at least one of Conditional Formulae (1'), (2'), and (3') below:

$$-0.45 < f/f1 < 0.15 \quad (1')$$

$$0.10 < d12/f < 0.32 \quad (2')$$

$$1.7 < TL/Y < 3.8 \quad (3')$$

3. An imaging lens as defined in claim 1 that satisfies Conditional Formula (1") below:

$$0.42 < f/f1 < 0.10 \quad (1'')$$

4. An imaging lens as defined in claim 1, wherein:
the 22 lens group is constituted only by a sub lens group having a negative refractive power and a single positive lens, provided in this order from the object side.

5. An imaging lens as defined in claim 1 that satisfies Conditional Formula (4) below:

$$1.75 < Nd22 \quad (4)$$

wherein Nd22 is the average value of the refractive indices of all of the lenses within the 22 lens group with respect to the d line.

6. An imaging lens as defined in claim 5 that satisfies Conditional Formula (4') below:

$$1.78 < Nd22 \quad (4')$$

7. An imaging lens as defined in claim 1, wherein:
a lens having at least one surface which is aspherical surface is provided within the 22 lens group.

8. An imaging lens as defined claim 1, wherein:
a negative lens having a surface toward the object side which is concave toward the object side in a paraxial region, and of which at least one surface is an aspherical surface, is provided within the 22 lens group.

9. An imaging lens as defined in claim 1, wherein:
the 21 lens group is constituted by a total of three lenses, which are a positive lens and a negative lens cemented together, and a single positive lens.

10. An imaging lens as defined in claim 1, wherein:
a positive lens having at least one aspherical surface is provided within the 21 lens group.

11. An imaging lens as defined in claim 1 that satisfies Conditional Formula (5) below:

$$1.1 < TL/\Sigma d < 1.5 \quad (5)$$

wherein $\Sigma d$ is the distance along the optical axis from the lens surface most toward the object side within the first lens group to the lens surface most toward the image side in the second lens group, and TL is the distance along the optical axis from the lens surface most toward the object side within the first lens group to the imaging surface, when focused on an object at infinity.

12. An imaging lens as defined in claim 11 that satisfies Conditional Formula (5') below:

$$1.20 < TL/\Sigma d < 1.45 \quad (5')$$

13. An imaging lens as defined in claim 1 that satisfies Conditional Formula (6) below:

$$0.8 < |f1n|/f < 1.2 \quad (6)$$

wherein f1n is the focal length of the first lens, and f is the focal length of the entire lens system.

14. An imaging lens as defined in claim 13 that satisfies Conditional Formula (6') below:

$$0.82 < |f1n|/f < 1.15 \quad (6')$$

15. An imaging lens as defined in claim 1 that satisfies Conditional Formula (7) below:

$$2.0 < (R21+R12)/(R21-R12) < 4.0 \quad (7)$$

wherein R12 is the radius of curvature of the surface toward the image side of the first lens, and R21 is the radius of curvature of the surface most toward the object side of the positive lens component.

16. An imaging lens as defined in claim 15 that satisfies Conditional Formula (7') below:

$$2.2 < (R21+R12)/(R21-R12) < 3.8 \quad (7')$$

17. An imaging lens as defined in claim 1, wherein:
the 22 lens group is constituted by three lenses, which are a negative lens, a negative lens, and a positive lens, provided in this order from the object side.

18. An imaging lens as defined in claim 1, wherein:
the 12 lens group is constituted only by a single positive lens.

19. An imaging apparatus equipped with an imaging lens as defined in claim 1.

* * * * *